US012167521B2

(12) United States Patent
Sooch et al.

(10) Patent No.: US 12,167,521 B2
(45) Date of Patent: Dec. 10, 2024

(54) ILLUMINATION SYSTEM AND METHOD THAT PRESENTS A NATURAL SHOW TO EMULATE DAYLIGHT CONDITIONS WITH SMOOTHING DIMCURVE MODIFICATION THEREOF

(71) Applicant: Lutron Technology Company LLC, Coopersburg, PA (US)

(72) Inventors: Nav Sooch, Austin, TX (US); Horace C. Ho, Austin, TX (US); Rebecca Frank, Austin, TX (US); Jason E. Lewis, Driftwood, TX (US); Ryan Matthew Bocock, Austin, TX (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/190,195

(22) Filed: Mar. 27, 2023

(65) Prior Publication Data

US 2023/0239985 A1    Jul. 27, 2023

Related U.S. Application Data

(60) Continuation of application No. 17/549,129, filed on Dec. 13, 2021, now Pat. No. 11,641,706, which is a
(Continued)

(51) Int. Cl.
*H05B 47/16*    (2020.01)
*H05B 45/20*    (2020.01)
(Continued)

(52) U.S. Cl.
CPC ........... *H05B 47/115* (2020.01); *H05B 45/20* (2020.01); *H05B 47/105* (2020.01); *H05B 47/16* (2020.01);
(Continued)

(58) Field of Classification Search
CPC ...... H05B 47/115; H05B 47/19; H05B 47/16; H05B 47/105; H05B 47/195; H05B 45/20; Y02B 20/40
See application file for complete search history.

(56) References Cited

U.S. PATENT DOCUMENTS 5,357,170 A    10/1994  Luchaco et al.
6,236,303 B1    5/2001  Wagner et al.
(Continued)

FOREIGN PATENT DOCUMENTS

CN    103298202 A    9/2013
CN    103687188 A    3/2014
(Continued)

OTHER PUBLICATIONS

"Final Office Action", U.S. Appl. No. 16/356,896, dated Mar. 26, 2021, 11 pages.
(Continued)

*Primary Examiner* — Henry Luong
(74) *Attorney, Agent, or Firm* — Michael S. Czarnecki; Glen R. Farbanish; Philip N. Smith

(57) ABSTRACT

An LED lamp and method are provided for autonomously changing the output brightness and color temperature of a plurality of LED strings to follow a first dimcurve in temporal synchronization with at least one other LED lamp. Synchronization is achieved based on a time of day determined using a clock signal. The output brightness and color temperature can transition from the first dimcurve to a second dimcurve over a predetermined number of scenes. The number of scenes is a function of a difference between the first dimcurve and the second dimcurve in at least one of the output brightness and the color temperature.

12 Claims, 9 Drawing Sheets

Related U.S. Application Data continuation of application No. 16/812,949, filed on Mar. 9, 2020, now Pat. No. 11,202,354, which is a continuation of application No. 16/222,430, filed on Dec. 17, 2018, now Pat. No. 10,624,171, which is a continuation of application No. 15/899,677, filed on Feb. 20, 2018, now Pat. No. 10,159,130, said application No. 16/812,949 is a continuation of application No. 15/265,322, filed on Sep. 14, 2016, now Pat. No. 10,621,836, said application No. 15/899,677 is a division of application No. 15/265,203, filed on Sep. 14, 2016, now Pat. No. 9,930,742.

(51) Int. Cl.
  *H05B 47/105* (2020.01)
  *H05B 47/115* (2020.01)
  *H05B 47/19* (2020.01)
  *H05B 47/195* (2020.01)

(52) U.S. Cl.
  CPC ........... *H05B 47/19* (2020.01); *H05B 47/195* (2020.01); *Y02B 20/40* (2013.01)

(56) References Cited

U.S. PATENT DOCUMENTS

| | | | |
|---|---|---|---|
| 7,663,325 | B2 | 2/2010 | McDonough et al. |
| 8,436,556 | B2 | 5/2013 | Eisele et al. |
| 9,237,623 | B1 | 1/2016 | Lewis et al. |
| 9,392,660 | B2 | 7/2016 | Dias et al. |
| 9,392,663 | B2 | 7/2016 | Knapp et al. |
| 9,578,724 | B1 | 2/2017 | Knapp et al. |
| 9,655,214 | B1 | 5/2017 | Sooch et al. |
| 9,655,215 | B1 | 5/2017 | Frank et al. |
| 9,674,917 | B1 | 6/2017 | Sooch et al. |
| 9,763,303 | B2 | 9/2017 | Steiner |
| 9,795,000 | B1 | 10/2017 | Sooch et al. |
| 9,860,965 | B2 | 1/2018 | Recker et al. |
| 9,930,742 | B1 | 3/2018 | Sooch et al. |
| 10,159,130 | B2 | 12/2018 | Sooch et al. |
| 10,237,945 | B2 | 3/2019 | Sooch et al. |
| 10,331,167 | B2 | 6/2019 | Hunter et al. |
| 10,405,397 | B2 | 9/2019 | Sooch et al. |
| 10,624,171 | B2 | 4/2020 | Sooch et al. |
| 2002/0038157 | A1 | 3/2002 | Dowling et al. |
| 2006/0002110 | A1 | 1/2006 | Dowling et al. |
| 2006/0076908 | A1 | 4/2006 | Morgan et al. |
| 2010/0084996 | A1 | 4/2010 | Van De Sluis et al. |
| 2010/0244735 | A1 | 9/2010 | Buelow, II |
| 2011/0084614 | A1 | 4/2011 | Eisele et al. |
| 2011/0175546 | A1 | 7/2011 | Ramer et al. |
| 2012/0038291 | A1 | 2/2012 | Hasain |
| 2012/0080944 | A1 | 4/2012 | Recker et al. |
| 2012/0319597 | A1 | 12/2012 | Park et al. |
| 2013/0082612 | A1 | 4/2013 | Kim et al. |
| 2013/0141018 | A1 | 6/2013 | Kamii |
| 2013/0218240 | A1 | 8/2013 | Feng et al. |
| 2013/0229113 | A1 | 9/2013 | Toda et al. |
| 2014/0052220 | A1 | 2/2014 | Pedersen |
| 2014/0062297 | A1* | 3/2014 | Bora ............... H05B 45/10 315/297 |
| 2014/0070707 | A1 | 3/2014 | Nagazoe |
| 2014/0191688 | A1 | 7/2014 | King |
| 2014/0244044 | A1 | 8/2014 | Davis et al. |
| 2015/0035437 | A1 | 2/2015 | Panopoulos et al. |
| 2015/0062892 | A1 | 3/2015 | Krames et al. |
| 2015/0179031 | A1 | 6/2015 | Wallace |
| 2015/0237703 | A1 | 8/2015 | Patel |
| 2015/0301716 | A1 | 10/2015 | Madonna et al. |
| 2015/0327340 | A1 | 11/2015 | Siessegger et al. |
| 2015/0359061 | A1 | 12/2015 | Adler |
| 2015/0373796 | A1 | 12/2015 | Bahrehmand |
| 2015/0377699 | A1 | 12/2015 | Ho et al. |
| 2015/0382422 | A1 | 12/2015 | Ho et al. |
| 2016/0029464 | A1 | 1/2016 | Hughes et al. |
| 2016/0066383 | A1 | 3/2016 | Dias et al. |
| 2016/0066384 | A1 | 3/2016 | Dias et al. |
| 2016/0074620 | A1 | 3/2016 | Toda et al. |
| 2016/0286616 | A1 | 9/2016 | van de Ven |
| 2016/0295658 | A1 | 10/2016 | Chraibi et al. |
| 2016/0366746 | A1 | 12/2016 | van de Ven et al. |
| 2017/0098354 | A1 | 4/2017 | Loeb et al. |
| 2018/0075714 | A1 | 3/2018 | Sooch et al. |
| 2018/0077770 | A1 | 3/2018 | Sooch et al. |
| 2018/0077771 | A1 | 3/2018 | Sooch et al. |
| 2018/0077783 | A1 | 3/2018 | Sooch et al. |
| 2018/0177016 | A1 | 6/2018 | Sooch et al. |
| 2019/0124743 | A1 | 4/2019 | Sooch et al. |
| 2019/0215927 | A1 | 7/2019 | Sooch et al. |

FOREIGN PATENT DOCUMENTS

| | | | |
|---|---|---|---|
| CN | 104048187 | A * | 9/2014 |
| CN | 105430832 | A | 3/2016 |
| EP | 2635093 | A2 | 9/2013 |
| WO | 2001099475 | A1 | 12/2001 |
| WO | 2015188086 | A1 | 12/2015 |

OTHER PUBLICATIONS

"International Search Report and Written Opinion", International Application No. PCT/US2017/45742, Dec. 11, 2017.
"Non-Final Office Action", U.S. Appl. No. 15/265,203, dated Jun. 26, 2017.
"Notice of Allowance", U.S. Appl. No. 15/265,203, dated Nov. 14, 2017.
"Office Action", Canadian Patent Application CA 3036805 A, dated May 25, 2021.
U.S. Appl. No. 13/970,990, filed Aug. 20, 2013.
U.S. Appl. No. 15/041,166, filed Feb. 11, 2016.
Lutron, "Wired SeeTouch QS Wallstation: Advanced Programming Mode", Lutron Electronics Co., Inc., Application Note #428, Revision A, Apr. 2012, pp. 1-18.

* cited by examiner

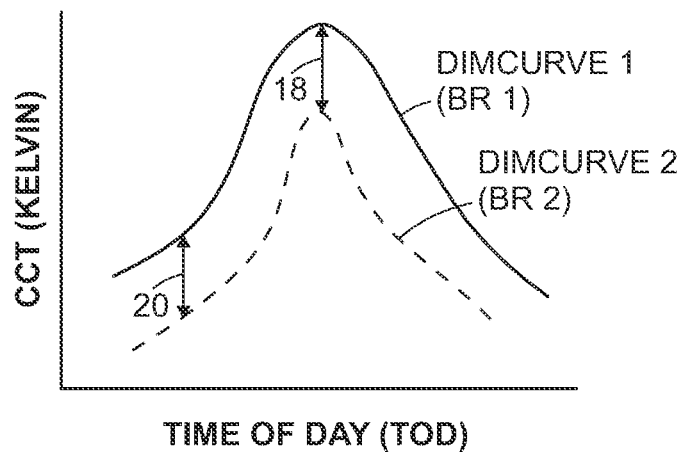
FIG. 5
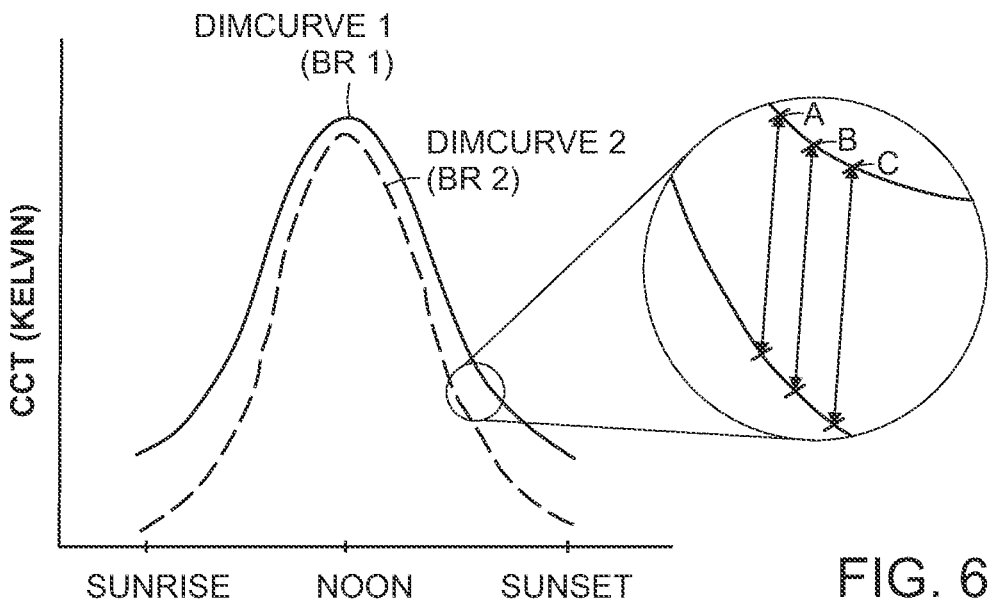
FIG. 6
| DIMCURVE 1 | | | |
|---|---|---|---|
| | SCENE A | SCENE B | SCENE C |
| BR | BR 1 | BR 1 | BR 1 |
| CCT | CCT A | CCT B | CCT C |
FIG. 7
| DIMCURVE 2 | | | |
|---|---|---|---|
| | SCENE A | SCENE B | SCENE C |
| BR | <BR 1 | <BR 1 | <BR 1 |
| CCT | <CCT A | <<CCT B | <<<CCT C |
FIG. 8

ILLUMINATION SYSTEM AND METHOD THAT PRESENTS A NATURAL SHOW TO EMULATE DAYLIGHT CONDITIONS WITH SMOOTHING DIMCURVE MODIFICATION THEREOF

CROSS-REFERENCE TO RELATED APPLICATIONS

This application is a continuation of U.S. application Ser. No. 17/549,129, field Dec. 13, 2021; which is a continuation of U.S. application Ser. No. 16/812,949, filed Mar. 9, 2020, now U.S. Pat. No. 11,202,354, issued Dec. 14, 2021; which is a continuation of U.S. application Ser. No. 16/222,430, filed Dec. 17, 2018, now U.S. Pat. No. 10,624,171, issued Apr. 14, 2020, which is a continuation of U.S. application Ser. No. 15/899,677, filed Feb. 20, 2018, now U.S. Pat. No. 10,159,130, issued Dec. 18, 2018, which is a divisional of U.S. application Ser. No. 15/265,203, entitled "Keypad with Color Temperature Control as a Function of Brightness Among Scenes and the Momentary or Persistent Override and Reprogram of a Natural Show and Method Thereof", now U.S. Pat. No. 9,930,742, issued Mar. 27, 2018. U.S. application Ser. No. 16/812,949 is also a continuation of U.S. Ser. No. 15/265,322, filed Sep. 14, 2016, now U.S. Pat. No. 10,621,836, issued Apr. 14, 2020. U.S. application Ser. Nos. 16/812,949, 16/222,430, 15/899,677, and 15/265,322 are incorporated by reference herein in their entireties.

U.S. Ser. No. 15/265,203 is related to applications filed concurrently therewith under U.S. Ser. No. 15/265,322, entitled "Global Keypad for Linking the Control of Shows and Brightness Among Multiple Zones Illuminated by Light Emitting Diodes Arranged Among a Structure", which issued Apr. 14, 2020, as U.S. Pat. No. 10,621,836, and Ser. No. 15/265,422, entitled "Illumination System and Method that Presents a Natural Show to Emulate Daylight Conditions with Smoothing Dimcurve Modification Thereof", which issued on May 17, 2017 as U.S. Pat. No. 9,674,917.

BACKGROUND OF THE INVENTION

Field of the Invention

This invention relates to illumination devices comprising light emitting diodes (LEDs), and keypads that can selectively control zone, scene, and show illumination among the LED illumination devices arranged among a structure based on changes to correlated color temperature (CCT) as a function of different dimcurves and brightnesses.

Description of Related Art

The following descriptions and examples are provided as background only and are intended to reveal information that is believed to be of possible relevance to the present invention. No admission is necessarily intended, or should be construed, that any of the following information constitutes prior art impacting the patentable character of the subject matter claimed herein.

Illumination devices, sometimes referred to as lighting fixtures, luminaries or lamps include incandescent illumination devices, fluorescent illumination devices and the increasingly popular LED illumination devices. LED illumination devices provide several advantages over traditional illumination devices, such as incandescent and fluorescent lighting fixtures. LED illumination devices have lower power consumption, longer lifetime, are constructed of minimal hazardous materials, and can be color tuned for different applications. For example, LED illumination devices provide an opportunity to adjust the chromaticity from red, to blue, to green, etc., or the correlated color temperature (alternatively referred to simply as "color temperature"), from warm white, to cool white, etc.

An LED illumination device can combine a number of differently colored emission LEDs into a single package. An example of a multi-color LED illumination device is one in which two or more different chromaticity of LEDs are combined within the same package to produce white or near-white light. There are many different types of white light LED illumination devices on the market, some of which combine red, green, and blue (RGB) LEDs, red, green, blue, and yellow (RGBY) LEDs, phosphor-converted white and red (WR) LEDs, RGBW LEDs, etc. By combining different chromaticity colors of LEDs within the same package, and driving the differently colored LEDs coated with or made of different semiconductor material, and with different drive currents, these illumination devices can mix their chromaticity output and thereby generate white or near-white light within a wide gamut of CCTs (color temperatures) ranging from warm white (e.g., 2600 K-3700 K), to neutral white (e.g., 3700 K-5000 K) to cool white (e.g., 5000 K-6000 K, or daylight (e.g., 6000 K-8300 K). Some multi-colored LED illumination devices also enable the brightness of the LED illumination device to be changed to a particular setpoint. These tunable LED illumination devices should all produce the same color and color rendering index (CRI) when set to a particular brightness and chromaticity on a standardized chromaticity diagram.

A chromaticity diagram maps the gamut of colors the human eye can perceive in terms of chromaticity coordinates and spectral wavelengths. The spectral wavelengths of all saturated colors are distributed around the edge of an outlined space (called the "gamut" of human vision), which encompasses all the hues perceived by the human eye. In the 1931 CIE Chromaticity diagram shown in FIG. 1, colors within the gamut 10 of human vision are mapped in terms of x/y chromaticity coordinates. The chromaticity coordinates, or color points, which lie along the blackbody locus, or curve 12, obey Planck's equation, $E(\lambda)=A\lambda^{-5}/(e^{(B/T)}-1)$. Color points that lie on or near the blackbody curve 12 provide a range of white or near-white light with color temperatures ranging between approximately 2000 K and 10,000 K. These color temperatures are typically achieved by mixing light from two or more differently-colored LEDs within the LED illumination device. For example, light emitted from RGB LEDs may be mixed to produce a substantially white light with a color temperature in the range of about 2300 K to about 6000 K. Although an illumination device is typically configured to produce a range of white or near-white color temperatures arranged along the blackbody curve 12 (e.g., about 2300 K to 6000 K), some illumination devices may be configured to produce any color within the color gamut triangle formed by the individual LEDs.

At least part of the blackbody curve 12 is oftentimes referred to as the "daytime locus" corresponding to the Kelvin scale of color temperatures of daytime. When implementing the daytime locus, it is desirable to emulate daytime color temperatures. Proper daytime emulation requires that target color temperatures increase after sunrise to noon local time, and thereafter decrease after noon to sunset. It is further desirable that the LED illumination devices arranged in various zones throughout the structure can thereafter appear as having the same target color temperature as that of the natural changes in the sun orientation to that structure. If emulation is needed for more than one zone, then one or more zones can be grouped into a scene. A scene is therefore made up of an illumination output from a group of LED illumination devices arranged throughout a structure as one or more zones. It is desirable that either the LED illumination devices within a zone or within one or more zones of a scene have the same illumination output at a particular time. Thus, a scene containing a plurality of LED illumination devices desirably has the same brightness and color temperature at a particular moment in time and thus is static for that scene. By its nature, a scene is static in terms of the illumination output (color temperature and brightness) for a period of time. Changing from one static scene to another scene to form different illumination outputs among a plurality of illumination devices within one or more zones forms what is known as a show. There may be other LED illumination devices within another scene throughout the structure that can have a different brightness and/or color temperature. For example, the illumination devices within a first scene can have a first brightness and/or color temperature, and the illumination devices within a second scene can have a second brightness and/or color temperature. The first scene can be a first illumination output from among a first group of illumination devices, whereas the second scene can be a second illumination output from among the same group of illumination devices, or from a different group of illumination devices.

It would be desirable to control each scene throughout the structure with a keypad. Buttons on the keypad can be dedicated to change the brightness and/or color temperature of a grouped scene of LED illumination devices. By depressing possibly a single button, the brightness and/or color temperature of a grouped plurality of illumination devices that form a scene can change from a first static illumination output to a second static illumination output until such time as the button is depressed again to make further illumination output changes.

It would also be desirable to automatically change at various times of day the static illumination output of the grouped scene of LED illumination devices. The change can occur by depressing buttons on the keypad at various times of day to change from one static output to another, or the change can occur automatically and at pre-defined, periodic intervals without any user intervention. The automatic, periodic changes to the illumination output of a grouped scene of LED illumination devices to another illumination output of the grouped scene forms a show. It would be desirable to map the different brightness and/or color temperature outputs from the grouped scene of LED illumination devices on a dimcurve, and to periodically change at least a portion of the dimcurve using buttons on the keypad. As a dimcurve changes from, for example, a first dimcurve to a second dimcurve, the grouped scene of LED illumination devices can change from one show along the first dimcurve to another show along the second dimcurve.

Although the term "scene" references at least one zone containing a plurality of LED illumination devices, scene hereinafter also references the illumination output from the at least one zone and that output comprises a brightness and color temperature from the at least one zone at a particular point in time and that extends for a period of time until another scene having a different illumination output is produced. Thus, a series of scenes along a dimcurve, each possibly having different brightness and color temperature values, comprise the dynamically changing scenes that form a show. A scene therefore represents not only one or more zones, but also a static brightness and color temperature output from the zones that, when automatically changed throughout the day, forms a show.

It is desirable that the target color temperatures needed to emulate the natural changes in the sun orientation to a structure containing LED illumination devices change not only as a function of brightness but also as a function of the time of day. The changes in color temperatures as a function of brightness and time of day form different dimcurves that at emulated sunrise, for example, the LED illumination devices can produce 2300-2700 K predominant emulated red with some yellow sunrise sky, at noontime 5000-6500 K predominant emulated blue noontime sky, and again at 2300-2700 K predominant emulated red sunset sky—similar to the differences between warm white, daytime/cool white, and back to warm white.

A need therefore exists in grouping LED illumination devices within one or more zones of a structure to form a scene, and to statically change the illumination output of the LED illumination devices of that grouped scene of illumination devices from one scene illumination output to another (i.e., from a first brightness and/or first color temperature of a first scene of the grouped scene of LED illumination devices to a second brightness and/or second color temperature of a second scene of the same grouped scene of LED illumination devices). A need also exists in forming a series of scenes (albeit the same plurality of LED illumination devices within the scene but with different brightness and/or color temperatures) along a dimcurve and to dynamically change the brightness and color temperature illumination output along the dimcurve to create a new dimcurve, and to map the color temperature and brightness values of the series of scenes for each dimcurve. A scene can be assigned to a particular time of day along a given dimcurve, with other scenes having different color temperature and brightness values assigned to other times of day. A further need exists for assigning the scenes, each having a mapped color temperature and brightness value, to various times of day to form a show. If the mapping is performed so that the color temperature emulates the daytime locus, the desired show becomes a natural show that will automatically change the color temperature output of the LED illumination devices within a scene at a particular time of day, and among a series of scenes throughout the day, along a dimcurve that relates to the daytime locus. A need further exists to control changes to color temperature output from a zone or a scene, and to control the natural show by momentarily, permanently, or persistently changing, in a smooth and non-disjointed fashion, the natural show among scenes at various times of day using one or more buttons on a single keypad, such as a global keypad.

SUMMARY OF THE INVENTION

An illumination system and method are provided for controlling color temperature as a function of brightness. The predominant feature of an LED illumination device can be the color temperature and brightness output therefrom. Various forms of white are needed throughout the day to form a natural show along a dimcurve. The natural show, and specifically the color temperature as a function of brightness, can change to emulate the position of the sun to the structure and, more particularly, the outside daytime and nighttime natural sunlight condition. An override or change to the natural show can be momentary, persistent, or permanent.

One mechanism to achieve color temperature control as a function of brightness is through use of a keypad that is communicatively linked to a plurality of LED illumination devices arranged about a structure. The plurality of illumination devices can be grouped into one or more zones within that structure, and one or more zones can be grouped to form a scene. According to one embodiment, a single keypad can control one or more zones of illumination devices that are wire or wirelessly coupled to the keypad. The keypad can control the color temperatures or brightness values associated with each zone, similarly. The keypad can also control a scene of one or more zones of illumination devices, similarly. Control of the zone or scene can occur by depressing a button on the keypad to statically change the brightness or color temperature from one state to another. The change can remain until the button is depressed again. Thus, the zone or scene can be statically controlled each time a button is depressed, until a button is depressed again.

A zone or scene can be statically controlled at specific times of day. As a series of scenes with the same plurality of LED illumination devices, but with different brightness and color temperatures, are mapped along a dimcurve to form a show, one or more of the scenes (and specifically the brightness and color temperatures of a grouped scene of illumination devices) can change in color temperature as a function of brightness and time of day. Automatic and periodic changes to static illumination outputs of the same group of illumination devices can form multiple scenes with different outputs along a dimcurve. If used to emulate daytime sunlight conditions, a mapped dimcurve will produce an increasing color temperature of the same plurality of illumination devices arranged within a scene, and hereinafter is referred to as a series of scenes with increasing color temperatures: scene A is a first scene of illumination devices at a relatively low color temperature, increasing to scene B of the first scene of illumination devices at a relatively higher color temperature, increasing further to scene C of the first scene of illumination devices at an even higher color temperature, etc. Even though scene A, scene B, scene C, etc., is the same scene in terms of the group of LED illumination devices being controlled, the color temperature as a function of brightness for that group changes throughout the day to form different scenes since color temperature can change nonetheless among the same scene or group of illumination devices. Accordingly, a scene not only can represent the same one or more zones (i.e., group of illumination devices) a scene also represents the illumination output of the group of illumination devices as color temperatures in relation to brightness and at different times of day to form a dimcurve having a sequence of scenes albeit from the same group of illumination devices.

According to one embodiment, for example, a sunrise illumination scene can be one that produces a color temperature used to emulate sunrise condition at a specific time of day, such as an hour after sunrise. A sunset scene, on the other hand, can be a scene possibly of the same group of illumination devices but has a color temperature output used to emulate sunset conditions and thus is specific to, for example, an hour before sunset.

A keypad arranged among the structure is communicatively coupled to a plurality of LED illumination devices, and the keypad preferably includes a plurality of buttons arranged upon the keypad. A first of the plurality of the buttons can be coupled to adjust brightness of the plurality of illumination devices within only the first zone, whereas a second of the plurality of buttons can be coupled to adjust brightness of the plurality of illumination devices within the illumination scene. The illumination scene can comprise the first zone, and preferably is a static illumination output of brightness and color temperature. That static output can be adjusted in terms of either color temperature, or brightness, or both. As noted above, the static, yet modifiable color temperature and/or brightness values output from a particular illumination scene can be changed upon activation of one or more buttons on the keypad. Also, a series of scenes with different, yet each having static illumination output can be dynamically changed by stringing together over the daytime and nighttime hours and mapping the strung-together scenes to a dimcurve to form a show. That mapped dimcurve forms the natural show if the color temperatures along the dimcurve are targeted to emulate the outside daytime illumination by the sun or, during nighttime, by the absence of the sun. A third of the plurality of buttons can be coupled to enable the natural show by automatically and periodically changing color temperature as a function of brightness of the plurality of LED illumination devices within the illumination scene over a plurality of differing times of day.

According to another embodiment, the first of the plurality of buttons further comprises a pair of first buttons. A first of the pair of first buttons is coupled to turn on and increase brightness of the plurality of LED illumination devices within only the first zone. A second of the pair of first buttons is coupled to turn off and decrease brightness of the plurality of illumination devices within only the first zone. The second of the plurality of buttons can further comprise a pair of second buttons. A first of the pair of second buttons is coupled to turn on and increase brightness of the plurality of illumination devices within the illumination scene. A second of the pair of second buttons is coupled to turn off and decrease brightness of the plurality of illumination devices within the illumination scene.

According to yet another embodiment, the fourth of the plurality of buttons further comprises a pair of fourth buttons. A first of the pair of fourth buttons is coupled to turn on and increase color temperature of the plurality of LED illumination devices within the illumination scene. A second of the pair of fourth buttons is coupled to turn off and decrease color temperature of the plurality of LED illumination devices within the illumination scene. The fifth of the plurality of buttons further comprises a pair of fifth buttons. A first of the pair of fifth buttons is coupled to turn on and increase brightness of the plurality of LED illumination devices within only the second zone. A second of the pair of fifth buttons is coupled to turn off and decrease brightness of the plurality of LED illumination devices within only the second zone.

The illumination system, in addition to LED illumination devices and a keypad, can also include a remote controller having a graphical user interface (GUI). For example, programming control of a first and second plurality of LED illumintion devices assigned to a keypad occurs through use of the remote controller and specifically the GUI of the remote controller. The GUI rendered on a screen of the remote controller is remote from yet wirelessly coupled to the first and second plurality of illumination devices as well as the keypad. On the GUI, a user can assign the first plurality of illumination devices to a first zone and the second plurality of illumination devices to a second zone. On the GUI, a plurality of scenes can also be created, each having possibly a unique brightness and color temperature. Each of the plurality of scenes can be created to control the color temperature as a function of brightness and time of day for the first and second plurality of illumination devices. Also on the GUI, a timed sequence of scenes can be grouped from among a plurality of scenes to form the natural show. The natural show extends along a first dimcurve having the highest color temperature substantially near a midpoint in time between sunrise and sunset.

Brightness can be changed among the first plurality of illumination devices within the first zone and among the second plurality of illumination devices within the second zone by depressing a first of the plurality of buttons on a first portion of the keypad and a fifth of the plurality of buttons on a second portion of the keypad, respectively. The natural show can also be changed to be along a second dimcurve having less brightness than the first dimcurve throughout the timed sequence of scenes at a color temperature among the first and second plurality of illumination devices that changes differently along the second dimcurve than the first dimcurve.

According to one embodiment, the natural show can be permanently changed to be along the second dimcurve by changing brightness among the first and second plurality of illumination devices for at least one scene among the time sequence of scenes by depressing the second of the plurality of buttons on a first portion and by thereafter depressing a third of the plurality of buttons on the first portion for a pre-determined amount of time. The natural show can be persistently changed for a timeout period by changing the brightness among the first and second plurality of illumination devices for at least one scene among the timed sequence of scenes by depressing the second of the plurality of buttons on the first portion and automatically, without user intervention, changing brightness among the first and second plurality of illumination devices back to the first dimcurve after a timeout has expired.

The natural show can also be changed to be along a second dimcurve having less brightness and less color temperature than the first dimcurve among the first and second plurality of illumination devices during the time sequence of scenes. Yet the amount of said less color temperature is dependent upon the time of day as a function of the amount of said less brightness. The natural show can then be permanently changed to be along the second dimcurve by changing brightness or color temperature among the first and second plurality of illumination devices for at least one scene among the timed sequence of scenes by depressing the second of the plurality of buttons on the first portion or the fourth of the plurality of buttons on the first portion, respectively, and thereafter depressing a third of the plurality of buttons on the first portion for a pre-determined amount of time. The natural show can also be persistently changed by changing brightness and color temperature among the first and second plurality of illumination devices for at least one scene among the timed sequence of scenes by depressing the second of the plurality of buttons on the first portion. Brightness and color temperature can be automatically changed among the first and second plurality of illumination devices back to the first dimcurve without user intervention after a timeout has expired.

According to yet another embodiment, the illumination system can be implemented using a global keypad. Multiple groups of LED illumination devices can be arranged among respective multiple zones throughout the structure. A singular, global keypad used to control all the LED illumination devices among the structure is communicatively coupled to the multiple groups of illumination devices and can include a plurality of buttons arranged upon the global keypad. At least one of the plurality of buttons can enable a panic show to turn on and off in automatic, periodic succession select ones of the multiple groups of illumination devices.

In addition to, or as an alternative to, turning on and off in automatic, periodic succession multiple groups of illumination devices, the global keypad can also enable the panic show to change color in select ones of the multiple groups of illumination devices when an intruder is detected within the structure or within a pre-defined distance of the structure. The changed color can be, for example, a white to a red color to indicate presence of the intruder.

The singular, global keypad can therefore be implemented in a method for illuminating a structure. The method can comprise emitting light from multiple groups of LED illumination devices within and proximate to a structure. A button can be depressed on the singular, global keypad to activate the away mode of operation. Once an intruder is detected within, or within a pre-defined distance of, the structure, the panic show is initiated among select ones of the multiple groups of illumination devices. The light emitted before the panic show can, for example, be a natural show that automatically and periodically changes color temperature as a function of brightness at a different time of day. When the intruder is detected, the natural show discontinues, and the panic show of periodic on/off illumination or change of color will be initiated.

An important aspect of the control of various scenes begins by mapping various natural shows among a plurality of illumination scenes. A series of illumination scenes, each having different color temperatures as a function of brightness and time of day forms a continuous dimcurve from sunrise to sunset, and even beyond sunset into nighttime. According to one embodiment, it is beneficial to map multiple natural shows, or multiple dimcurves, each having a plurality of illumination scenes, and each scene on each dimcurve having a unique color temperature as a function of brightness that is different from other scenes on that dimcurve. Thus, the color temperature of all illumination devices is designed to change with brightness and time of day. However, the amount of change depends on the color temperature at full brightness. The changing color temperature at full brightness can be along a first dimcurve, and as brightness decreases, a second, followed by a third, etc., dimcurve is formed. As brightness decreases, the subsequent dimcurves (second dimcurve, third dimcurve, etc.) illustrate that as a plurality of illumination devices associated with the scene produce 2700 K at full brightness, the same plurality of LED illumination devices will produce a significantly lower color temperature at lower brightness values. Meanwhile, the plurality of illumination devices producing 5000 K at full brightness will produce only a slightly lower color temperature at lower brightness values. Thus, the dimcurves, and specifically, the changes in color temperature, are a function not only of full brightness but brightness in general. Color temperature is also relative to the time of day, so that each dimcurve at different brightness values, at full brightness and below, will have a differing mapped shape.

The mapping of color temperature at full brightness to form, for example, the first dimcurve, and the mapping of color temperature at lower brightness values to form the second dimcurve, third dimcurve, etc., is fixed during the mapping, or provisioning process. The mapping, or provisioning process, occurs via the GUI and subsequent storage of the produced dimcurves within the plurality of LED illumination devices. Thereafter, the mapped dimcurves can be drawn, or fetched from the illumination devices when, for example, a control signal addressed to the particular group of illumination devices is sent from the depressed button on the keypad.

According to a first embodiment, a system is provided for creating dimcurve mappings of natural shows among a plurality of illumination scenes. The system comprises a remote controller having a GUI that is adapted for creating a first scene and a second scene among the plurality of illumination scenes applied exclusively to a first group of the plurality of LED illumination devices. The GUI is further adapted to assign a first color temperature as a first function of brightness for the first group of the plurality of illumination devices to form the first scene at a first time of day. The GUI is still further adapted to assign a second color temperature as the first function of brightness for the first group of the plurality of illumination devices to form the second scene at a second time of day different from the first time of day. The storage medium within the first group of the plurality of illumination devices is configured to store the first and second color temperatures as a first function of brightness for the respective first and second scenes to form at least a portion of a first dimcurve mapping of a first natural show.

The immediately preceding process can be repeated on the GUI to create a third scene and a fourth scene among the plurality of illumination scenes, with third and fourth color temperatures assigned as a second function of brightness for the first group of the plurality of illumination devices. The ensuing third and fourth scenes can be stored within the storage medium as a second function of brightness to form at least a portion of a second dimcurve mapping of a second natural show.

After the mappings of first and second dimcurves are achieved, the first natural show associated with the first dimcurve can thereafter be at least partially changed to the second natural show associated with the second dimcurve. The method of changing from a first dimcurve to a second dimcurve is preferably smooth and non-disjointed. To achieve a smooth and non-disjointed change, the method includes first fetching a first dimcurve comprising a first series of scenes assigned to at least one group of LED illumination devices, each of said first series of scenes including a color temperature as the first function of brightness. The first series of scenes is then assigned a time-spaced distance apart throughout the day to form the first natural show associated with the first dimcurve of color temperatures that increases from sunrise to noon and decreases from noon to sunset. The brightness or color temperature of one of the first series of scenes at a particular time of day between sunrise to sunset can then be changed. If the changed brightness produces a color temperature of one of the first series of scenes within a pre-defined distance of a point on the second dimcurve, a second fetching operation is achieved on at least a remaining portion of the second dimcurve comprising a second series of N number of scenes preceding the changed scene and N number of scenes succeeding the changed scene.

Preferably, the point on the second dimcurve is a color temperature of a scene on that second dimcurve at a particular time of day. The pre-defined distance is preferably 10% of the color temperature of the scene on the second dimcurve at the particular time of day. The pre-defined distance is preferably less than 65 K. Each of the second series of N number of scenes preceding the changed scene and each of the N number of scenes succeeding the changed scene includes a color temperature as a second function of brightness. Preferably, the second function of brightness is different from the first function of brightness, and N is less than three.

According to an alternative embodiment, if the changed brightness or color temperature of one of the first series of scenes is within a pre-defined color temperature or brightness of a scene on the second dimcurve at the particular time of day, then the second fetching is that of at least a portion of the second dimcurve comprising a second series of N number of scenes preceding the changed scene and N number of scenes succeeding the changed scene to provide a smooth and non-disjointed second natural show.

BRIEF DESCRIPTION OF THE DRAWINGS

Other objects and advantages of the invention will become apparent upon reading the following detailed description and upon reference to the accompanying drawings.

FIG. 5 is a graph of different dimcurves representing different relationships of color temperature as a function of changes in brightness shown in FIG. 4.

FIG. 6 is a graph of changes in daytime color temperatures as a function of changes in brightness values and the time of day to emulate a natural daytime illumination show and the associated different possible dimcurves representing different natural shows.

FIG. 7 is a table showing the relationship between a first brightness value and three different color temperatures among three different scenes during the natural show emulated along the first dimcurve of FIG. 6.

FIG. 8 is a table showing the relationship between a second brightness value less than the first brightness value, and three different color temperatures among three different scenes during the natural show emulated along the second dimcurve of FIG. 6.

Figure 1:
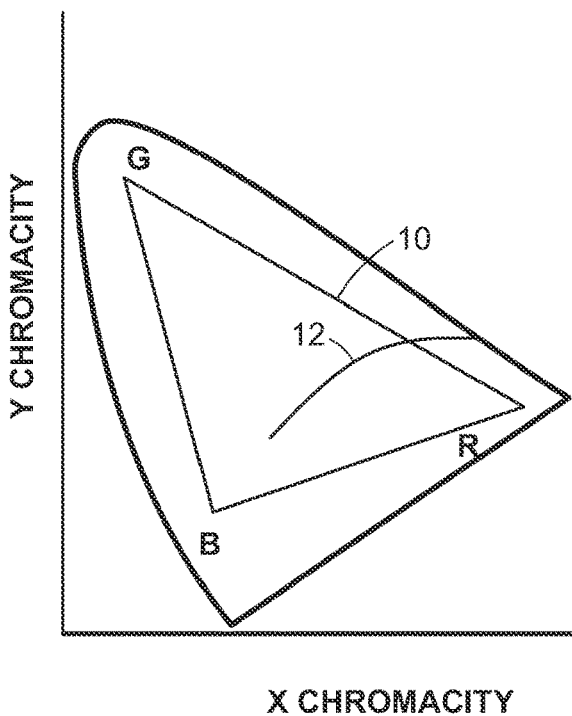
FIG. 1 is a graph of the 1931 CIE chromaticity diagram illustrating the blackbody curve of color perception or color temperatures, and the gamut of spectral wavelengths achievable by the illumination device comprising a plurality of LEDs of different color.

While the invention is susceptible to various modifications and alternative forms, specific embodiments thereof are shown by way of example in the drawings and will herein be described in detail. It should be understood, however, that the drawings and detailed description thereto are not intended to limit the invention to the forms disclosed, but on the contrary, the intention is to cover all modifications, equivalents, and alternatives falling within the spirit and scope of the present invention as defined by the appended claims.

DETAILED DESCRIPTION OF THE PREFERRED EMBODIMENTS

Figure 2:
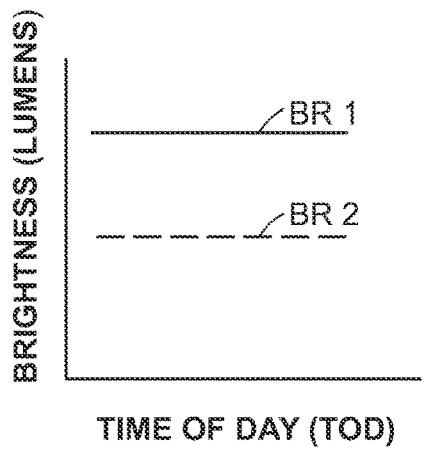
FIG. 2 is a graph of changes in brightness throughout the daytime hours.

Turning now to the drawings, FIG. 2 illustrates a change in brightness throughout daytime hours. For example, a full brightness (BR1) represents near maximum lumen value that can be output from one or more LED illumination devices. The maximum brightness can be established either by the manufacturer or by a user, and therefore can be any value that can vary from manufacturer to manufacturer or from user to user. Also shown in the graph of FIG. 2 is a change from maximum brightness BR1 to a lessened brightness BR2, also throughout the daytime hours and possibly extending to nighttime hours. The lessening of brightness can be effectuated by activating a button or a slider on, for example, a keypad. The keypad would be communicatively coupled to the group of LED illumination devices affected by that keypad and, specifically, the change in brightness value can be proportional to the amount of time a button is depressed, or the distance a slider is moved. In some instances, however, the relationship between the brightness output from an illumination device is non-linear relative to actuation of a button or a slider. For example, depending on the button or slider, initial movement of the button/slider may result in a small effect on the output brightness and, as further actuation occurs the brightness increases or decreases non-linearly relative to actuation.

Figure 3:
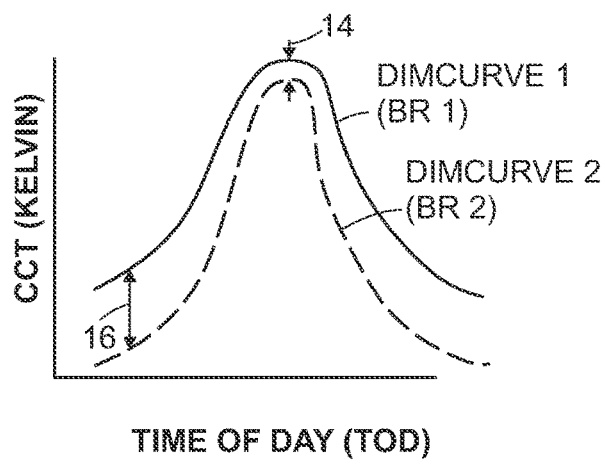
FIG. 3 is a graph of different dimcurves representing different relationships of color temperature as a function of changes in brightness shown in FIG. 2.

FIG. 3 illustrates another graph of different dimcurves that represent different relationships of color temperature as a function of the change in brightness shown in FIG. 2. At full brightness BR1, a first dimcurve (dimcurve 1) is produced. Specifically, dimcurve 1 represents changing color temperature dependent not only on the full brightness BR1 value, but also on the time of day. To emulate the position of sun relative to the structure, and the path length between the sun and the structure that contains the plurality of LED illumination devices, color temperature must change throughout the day to emulate the natural sunlight conditions produced by the sun's relative position. During sunrise and shortly thereafter, color temperature is much less than noontime local time. The same can be said for sunset. The lower color temperatures emulate the more red or yellow sunrise and sunset color coordinate of the warm white color temperatures, whereas the blue color coordinate predominates the noontime blue sky. The noontime blue sky approaches that of more of a natural or daytime white, rather than the warm white of the incandescent glow associated with sunrise and sunset. The first dimcurve has a color temperature that peaks near noontime and decreases at times of day before noontime and after noontime.

As brightness decreases to, for example, BR2, as shown in FIG. 2, a second dimcurve (dimcurve 2) shown in dashed line is formed. Like dimcurve 1, dimcurve 2 is illustrated in FIG. 3 as emulating the natural sunlight conditions surrounding the structure. Therefore, dimcurve 2 also has a color temperature that peaks near noontime and decreases near sunrise and sunset.

As shown in FIG. 3, the color temperature of all LED illumination devices changes with brightness. However, the amount of change in color temperature depends on the color temperature at full brightness BR1. If natural sunlight emulation is to be achieved, color temperature also depends on the relative times of day. As shown in FIG. 3, an LED illumination device producing 2300 to 2700 K at sunrise or sunset times of day at full brightness (BR1) will produce a significantly lower color temperature at a lower brightness (BR2). Yet, however, the LED illumination device producing, for example, 5000 to 6500 K at noontime time of day at full brightness (BR1) will produce only a slightly lower color temperature at lower brightness (BR2). The differences can be illustrated in reference to the differences in color temperatures at, for example, 5000 K-6500 K, shown by reference numeral 14, versus the color temperature at 2300 K-2700 K, shown by reference numeral 16.

FIG. 3 illustrates not only the formation of different dimcurves with changes in brightness, but also that each dimcurve has a correspondingly different relationship between color temperature and brightness. For example, dimcurve 2 demonstrates a greater change in color temperature as a function of a reduced brightness BR2 than does the color temperature change along dimcurve 1 at full brightness BR1. As will be described in more detail below, each dimcurve represents a timed sequence of scenes, with each scene having its own color temperature as a function of brightness at a particular time of day. As different scenes are aggregated along a dimcurve throughout the day, a natural show is formed. However, the natural show along the dimcurve 1 can be quite different from the natural show along dimcurve 2, with each dimcurve having its own relationship between changes in color temperature as a function of brightness. Each dimcurve, and the associated scenes along each dimcurve, have a unique color temperature relationship to brightness that is preferably different from other dimcurves so that the plurality of dimcurves that can be mapped demonstrate differing changes in color temperature in relation to brightness. To emulate natural sunlight conditions when forming a natural show, it is necessary to therefore map multiple dimcurves such that if the natural show changes, at least a portion of a mapped dimcurve can be fetched from local memory to thereafter present the changed-to natural show among each of the LED illumination devices undergoing a change. Mapping of multiple dimcurves is also needed for each group of illumination devices among the structure.

Figure 4:
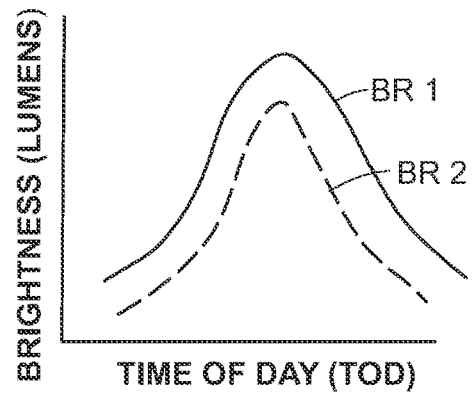
FIG. 4 is a graph of changes in brightness that vary throughout the daytime hours.

FIGS. 4 and 5 are like FIGS. 2 and 3. However, FIG. 4 illustrates that while the relative change in brightness is the same throughout the day, the absolute brightness values, both in BR1 and BR2, vary throughout the day. Based on the similar relative differences between BR1 and BR2 of FIG. 4, FIG. 5 indicates a resulting LED illumination device producing approximately the same difference in color temperatures among dimcurve 1 and dimcurve 2, regardless of whether the color temperature is 2300 K-2700 K or 5000 K-6500 K. The similarity is shown by reference numerals 18 and 20 in FIG. 5.

Regardless of whether the brightness change throughout the day is similar in absolute terms, as in FIG. 2, or in relative terms, as in FIG. 4, the graphs in FIGS. 3 and 5, respectively, illustrate that color temperature of a controlled group of LED illumination devices changes throughout the day differently with brightness change—either in absolute or in relative. Moreover, FIGS. 3 and 5 illustrate that multiple dimcurves must be mapped so that when a change is made to a natural show, the appropriate change can be found within a previously mapped dimcurve and the smoothing of transition to the new natural show can occur with minimal user perception of that change, both prior to and after the change of a particular scene was made.

Referring to FIG. 6, two dimcurves, dimcurve 1 and dimcurve 2, are shown during daytime hours between sunrise and sunset. It is understood and preferred that there are more than two dimcurves that can be mapped, and the daytime hours can extend into nighttime hours for more than two dimcurves during a 24-hour period. However, for sake of brevity, FIG. 6 shows only two dimcurves indicating changes in daytime color temperatures as a function of changes in brightness throughout the day to emulate a natural daytime illumination show with associated different possible dimcurves representing different natural shows. To emulate daylight conditions, the color temperature during noontime local can be 5000 K or greater, whereas the color temperature from sunrise to an hour after sunrise, for example, can be 2700 K or less. The same would apply to an hour before sunset to sunset, with a color temperature of 2700 K or less. Of course, the color temperatures can vary more than an hour after sunrise and less than an hour before sunset to produce, preferably, a smooth dimcurve at multiple scenes and associated times between sunrise and noon as well as between noon and sunset. The smooth dimcurve can also extend before sunrise and after sunset to include nighttime, if desired, with a nighttime color temperature at or near zero Kelvin.

Shown in FIGS. 6 and 7 is a sequence of scenes separated in time for each dimcurve. For example, scene A represents a brightness and color temperature along dimcurve 1 of BR1 and CCTA (color temperature A), shown in FIG. 7. The scene A along dimcurve 1 is also shown in FIG. 6. As noted above, a scene represents a group of one or more zones of LED illumination devices having a static illumination output of color temperature and brightness at a particular moment in time. As time progresses from scene A to scene B, of the same plurality of LED illumination devices, along dimcurve 1, although the brightness can remain at, for example, full brightness or BR1, the color temperature is shown to decrease to CCTB. Meanwhile, as the show progresses along dimcurve 1 to scene C, the full brightness BR1 remains, yet the color temperature further decreases to CCTC as shown in FIGS. 6 and 7.

The purpose in having multiple dimcurves mapped to a local storage device within one or more groups of LED illumination devices is illustrated in the comparison between FIGS. 7 and 8, as shown in the graph of FIG. 6. If a different natural show is to be selected from, for example, a dimcurve 2 instead of dimcurve 1, brightness can be reduced, as shown by BR2 being less than BR1 at scenes A, B, and C along dimcurve 2. However, a decrease in brightness from BR1 to BR2 produces an increased reduction in color temperature from scene A to scene B to scene C along dimcurve 2, relative to dimcurve 1. This is shown in FIG. 8, with CCTA along dimcurve 2 slightly less than that of CCTA along dimcurve 1, yet CCTB along dimcurve 2 is more so less than CCTB along dimcurve 1, and CCTC along dimcurve 2 is even more so less than that of CCTC along dimcurve 1. The quantities by which the color temperatures further decrease relative to an equal decrease in brightness from BR1 to BR2 is not of consequence as much as to denote the greater change in color temperature among scenes along dimcurve 2 than along dimcurve 1. This effect is therefore represented as the amount of color temperature change present in LED illumination, that change being one that occurs differently with changes in brightness. The color temperature change throughout the day therefore not only depends on the color temperature at full brightness, but also depends on the amount of change in brightness from full brightness BR1 to a lower brightness BR2, with greater change near sunrise and sunset than during noon no matter the amount of brightness change.

Figure 9:
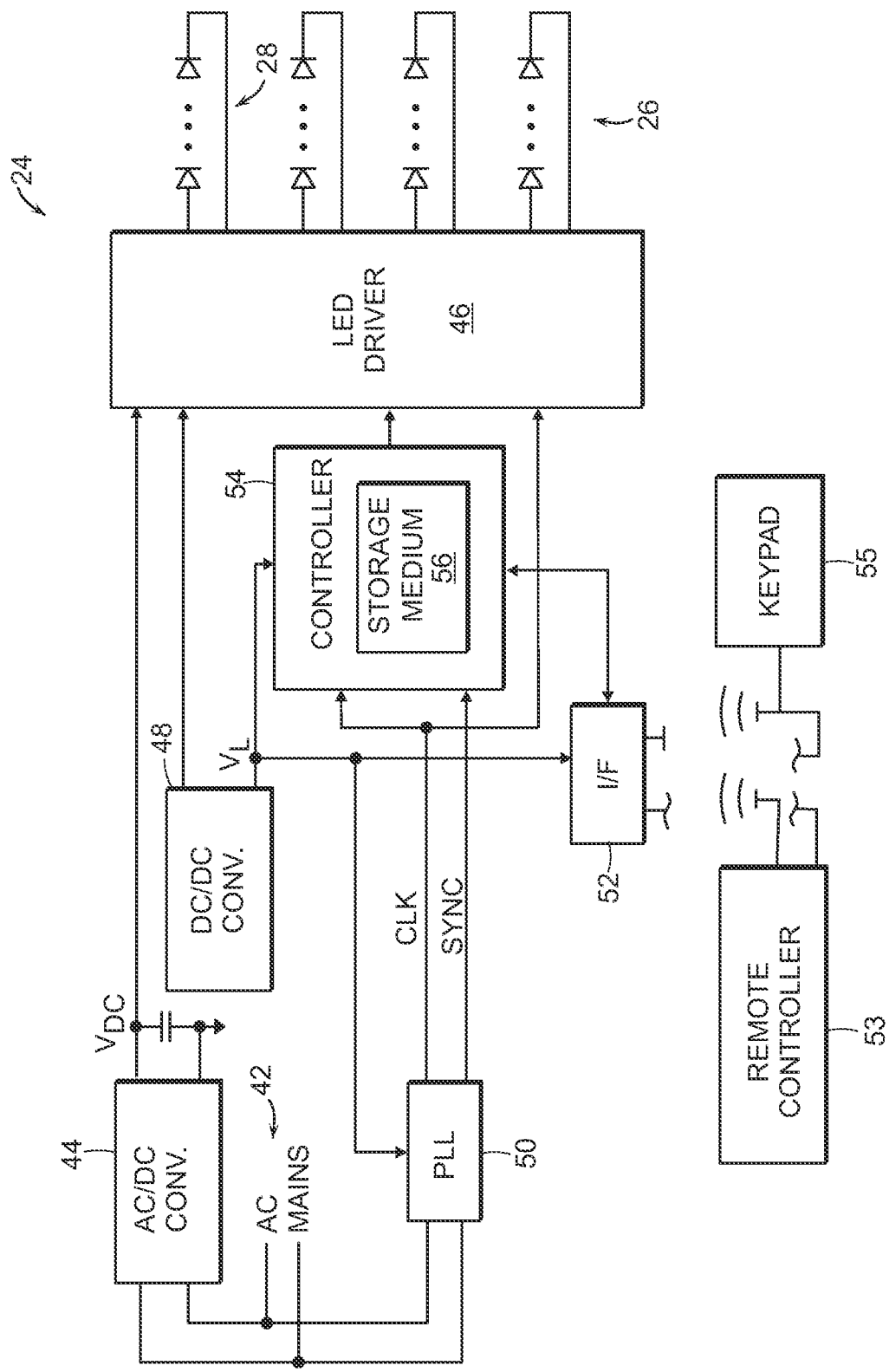
FIG. 9 is an exemplary block diagram of an illumination device comprising a power supply converter, a clocking circuit, a driver circuit, a controller with storage medium, and a plurality of different colored LED chains.

FIG. 9 illustrates an exemplary block diagram of an LED illumination device 24 according to one embodiment of the invention. The LED illumination device 24 provides one example of the hardware and software that may be used to implement a method of emulating natural sunlight both dynamically and automatically, and thereafter manually overriding that emulation when one or more lighting tasks are needed. Moreover, the LED illumination device 24 can be among a plurality of LED illumination devices within a zone or within one or more zones which constitute a scene.

LED illumination device 24 comprises a plurality of emission LEDs 26 and, in this example, comprises four chains of any number of serially-connected LEDs. Each chain 28 may have two to four LEDs of the same color, which are coupled in series and configured to receive the same drive current. In one example, the emission LEDs 26 may include a chain of red LEDs, a chain of green LEDs, a chain of blue LEDs, and a chain of white or yellow LEDs. However, the preferred embodiments are not limited to any particular number of LED chains, any particular number of LEDs within each chain, or any particular color or combination of the LED colors. In some embodiments, the emission LEDs 26 may be mounted on a substrate and encapsulated within a primary optic structure of an emitter module, possibly along with one or more photodetectors.

In addition to emission LEDs 26 configured into a set of chains 28, illumination device 24 includes various hardware and software components for powering the LEDs 26 and controlling the light output from the one or more emitter modules. In the embodiments shown in FIG. 9, LED illumination device 24 is connected to AC mains 42 and includes an AC/DC converter 44 for converting the AC mains voltage (e.g., 120 V or 240 V) to a DC voltage ($V_{DC}$) The DC voltage (e.g., 15 V) is supplied to LED driver circuits 46 to produce the drive currents, which are supplied to the emission LEDs 26 for producing illumination. In the embodiment of FIG. 9, a DC/DC converter 48 is included for converting the DC voltage ($V_{DC}$) to a lower voltage $V_L$ (e.g., 3.3 V), which is used to power the lower voltage circuitry of the illumination device 24, such as the phase-locked loop (PLL) 50, interface 52, and control circuitry, or controller 54. In other embodiments, illumination device 24 may be powered by a DC voltage source (e.g., a battery), instead of AC mains 42. In such embodiments, the illumination device may be coupled to the DC voltage source and may or may not include a DC/DC converter in place of the AC/DC converter 44. Additional timing circuitry may be needed to provide timing and synchronization signals to the controlling driver circuits.

In the illustrated embodiment, PLL 50 is included within illumination device 24 for providing timing and synchronization signals. PLL 50 can lock onto the AC mains frequency and can produce a high-speed clock (CLK) signal and synchronization signal (SYNC). The CLK signal provides timing signals for the controller 54 and LED driver circuits 46. In one example, the CLK signal frequency is in the tens of MHz range (e.g., 23 MHz), and is synchronized to the AC mains frequency and phase. The SYNC signal is used by the controller 54 to create the timing signal used to control the LED driver circuits 46. In one example, the SYNC signal frequency is proportional to the AC mains frequency and can be at a frequency of 50 or 60 MHz with a phase alignment with the AC mains.

In a preferred embodiment, interface 52 may be included within illumination device 24 for receiving data sets, or content, from an external calibration tool. The calibration tool is preferably a remote controller 53 that, during provisioning or commissioning of the LED illumination devices 24, performs a mapping function of various dimcurves contained in datasets or content stored in the illumination devices 24. The data sets or content generated by or received via interface 52 may be stored in a mapping table within storage medium 56 of controller 54, for example. Examples of data sets or content that may be received via interface 52 include, but are not limited to, various luminous flux (i.e., brightness values associated with intensity), wavelength, chromaticity of the light emitted by each LED chain, and as described in more detail below, various color temperatures as a function of brightness along certain dimcurves, and the association into zones or scenes of a plurality of LED illumination devices arranged within a structure. The mapping information can be assigned through a GUI upon remote controller 53, with each mapped dimcurve having a plurality of scenes and each scene having a unique color temperature as a function of brightness along that dimcurve. The plurality of dimcurves, and scenes associated with each dimcurve, as well as the grouping of illumination devices among zones and one or more zones (scenes) within a structure, also occurs through user input via the GUI, with storage medium 56 containing the mapped results as well as identifiers for the respective illumination device among a zone or scene.

Coupled by wire or wireless to interface 52 is a keypad 55. Keypad 55 comprises a plurality of buttons used to control the illumination device 24. However, control by keypad 55 is based on the datasets stored in storage medium 56 via the provisioning, commissioning, and mapping functionality carried out by remote controller 53, and specifically the GUI of remote controller 53. Keypad 55, and specifically the buttons upon keypad 55, allow for user actuation and the enabling of various natural shows stored as various dimcurves and resulting mapped datasets within storage medium 56. Keypad 55 can also be used to override a natural show, and that override can be either momentary or persistent. Keypad 55 can also be used to permanently change a natural show so that, after change, the changed-to natural show will remain. Thereafter, and at various times of day, a different scene will appear than that which was present in the previous show. Keypad 55 not only allows changes to a show, either momentarily, persistently, or permanently, but can change a static setting, such as a single scene among one or more zones within a structure. One or more buttons upon keypad 55 can therefore change the color temperature setting or the brightness setting among a scene or a zone.

As will be noted in more detail below, various buttons on keypad 55 send control signals to interface 52, and those control signals enable different functionality based on the data sets stored in control medium 56 of the grouped plurality of LED illumination devices 24 being controlled. Interface 52 can therefore comprise a wireless interface that is configured to operate according to ZigBee, Wi-Fi, Bluetooth, or any other proprietary or standard wireless data communication protocol. In other embodiments, interface 52 can communicate optically using infrared (IR) light or visible light. Still further, interface 52 may comprise a wired interface, such as one or more wired conductors or a bus to keypad 55. For example, if remote controller 53 is part of keypad 55, then interface 52 communicates via remote controller 53 over the wired connection of keypad 55. Preferably, however, the remote controller 53 is separate from keypad 55 and is used in the provisioning or mapping process. Remote controller 53, if separate, is preferably wirelessly connected to interface 52 using, for example, ZigBee wireless data communication protocol. Keypad 55, however, can be either wirelessly coupled or wired to interface 52. In a preferred embodiment, keypad 55 is both wired and wirelessly coupled to interface 52 since LED illumination devices have photodetectors that can receive the control signals of keypad 55 or can also receive control signals through a wired conductor.

Both keypad 55 as well as remote controller 53 can include a timer, such as a real-time clock. The timer can send a plurality of time-of-day signals to the controller 54 via interface 52. For example, if the remote controller 53 comprises the physical keypad 55 or is separate from the physical keypad 55, either the remote controller 53 or the physical keypad 55 can have a real-time clock. The real-time clock, depending on the calendar day and time of day, periodically sends a time-of-day signal from among a plurality of time-of-day signals. The time-of-day signal is unique to the local calendar day and local time of day and is output by the timer to the plurality of LED illumination devices 24, each of which have an interface 52 communicatively coupled to the remote controller 53 and/or keypad 55.

In addition to the time-of-day signals sent from remote controller 53 and/or keypad 55, LED illumination devices 24 are also time synchronized from PLL 50. Controller 54 receives the time-of-day signals as well as the SYNC signal and calculates, based on color temperature mappings as a function of brightness and time of day stored in medium 56, and produces values indicating a desired drive current to be supplied to each of the LED chains 28. This information may be communicated from controller 54 to LED driver circuits 46 over a serial bus conforming to a standard, such as SPI or I²C, for example. In addition, controller 54 may provide a latching signal that instructs the LED driver circuits 46 to simultaneously change the drive current supply to each of the LED chains 28 to prevent brightness and color artifacts.

Controller 54 may be configured for determining respective drive currents needed to achieve a desired luminous flux, or brightness, for the illumination device 24 and specifically the LED chains 28 of illumination device 24 in accordance with one or more systems and methods described in U.S. patent application Ser. No. 14/314,530, published on Dec. 31, 2015 as U.S. Publication No. 2015/0382422 A1; Ser. No. 14/314,580, issued on Jul. 12, 2016 as U.S. Pat. No. 9,392,663; and Ser. No. 14/481,081, published on Mar. 3, 2016 as U.S. Publication No. 2016/0066384 A1, which are commonly assigned and incorporated herein in their entirety. In the preferred embodiment, controller 54 may be further configured for adjusting the ratio of drive current supplied to the emission LED chains 28 and to all the LED chains 28 concurrently. Changing the ratio effects a change in color temperature and changing the chains similarly can change brightness. Controller 54 can also chain either similarly all the chains the same or chains differently so as not to exceed a maximum safe current level or a maximum safe power level attributed to one or more power converters of the LED illumination device 24 at a preset operating temperature as determined by a temperature sensor, for example.

In some embodiments, controller 54 may determine the respective drive currents by executing program instructions stored within storage medium 56. In one embodiment, the storage medium 56 that stores the mappings necessary to derive various dimcurves as well as the groupings of illumination devices among zones and scenes, and further the brightness value and color temperature value changes via brightness and color temperature of control signals sent thereto, may be configured for storing the program instructions along with a table of calibration values, as described, for example, in U.S. patent application Ser. No. 14/314,451, published on Dec. 31, 2015 as U.S. Publication No. 2015/0377699 A1, and Ser. No. 14/471,057, issued on Jul. 12, 2016 as U.S. Pat. No. 9,392,660, which are commonly assigned and incorporated herein in their entirety. Alternatively, controller 54 may include combinatorial logic for determining the desired drive currents, either as a ratio or similarly among the LED chains 28. The storage medium 56 need only be used for storing the mapping tables of dimcurves and the brightness/color temperature output values among each dimcurve in response to control signals.

In general, LED driver circuits 46 may include a number of driver blocks equal to the number of emission LED chains 28 included within the LED illumination device 24. In one embodiment, LED driver circuits 46 comprise four driver blocks, each configured to produce illumination from a different chain 28 of the emission LED chains 28, as shown in FIG. 9. Each driver block can therefore receive data indicating a desired drive current from controller 54, along with a latching signal indicating when the driver block should change the drive current into each respective LED chain 28. An example of the various driver blocks needed for each respective LED chain as controlled by the LED drivers 46 is set forth in U.S. patent application Ser. No. 13/970,990, which is commonly assigned and incorporated herein in its entirety.

DC/DC converter 48 may include substantially any type of DC/DC power converter including, but not limited to, buck converters, boost converters, buck-boost converters, auk converters, single-ended primary-inductor converters, or flyback converters. AC/DC converter 44 may likewise include substantially any type of AC/DC power converter including, but not limited to, buck converters, boost converters, buck-boost converters, etc. Each of these power converters generally comprise a number of inductors (or transformers) for storing energy received from an input voltage source, a number of capacitors for supplying energy to a load, and a switch for controlling the energy transfer between the input voltage source and the load. The output voltage supplied to the load by the power converter may be greater than or less than the input voltage source, depending on the type of power converter used.

Among the various advantages of LED illumination devices, such as device 24 in FIG. 9, is that LEDs offer distinct opportunities of being able to integrate artificial light with natural light, and to provide helpful lighting through dynamic lighting mechanisms. One particular niche of LED illumination devices is in the generation of artificial sunlight for a variety of reasons, especially for treating human ailments such as circadian rhythm disorders, seasonal affective disorders, shift work condition disorders, etc. The mechanism by which any conventional LED illumination device replicates or "emulates" natural sunlight conditions is through use of sensors. However, sensors can detect sunlight conditions within a structure interior to that structure and create artificial lighting from the illumination device that attempts to replicate the natural sunlight condition or the emulated sunlight outside the structure. Unfortunately, sensors have limitations both in technology and the location where those sensors are located. The sensors therefore do not always accurately detect the exterior sunlight conditions, and the outdoor natural sunlight conditions sometimes cannot be properly emulated.

According to a preferred embodiment, alternative mechanisms that keep track of the time of day and send a plurality of time-of-day values from a timer within the remote controller 53 and/or keypad 55 is preferred. Use of timers and time-of-day values proves beneficial if the circadian show is to be tailored differently depending on the room in which the sunlight is being emulated. Sensors cannot tailor emulation depending on the room, but instead sense and provide emulation consistently throughout the structure depending on where the sensors are located. Grouping of illumination devices on a room-by-room basis and controlling each room separately using different keypads 55 with different associated timers within those keypads that control each room separately, with different time-of-day values, is therefore indigenous to timers and not sensors—an added benefit of not using sensors to control sunlight emulation in the bedroom different from the kitchen, for example.

Emulating the natural sunlight conditions involves generating a natural show through use of a timer that manipulates and updates emulation from a grouped set of LED illumination devices based on calendar day and time of day, and that functionality is performed automatically and dynamically throughout the day. The automatic emulation occurs as a dynamically changing natural show that continues automatically without user intervention, and specifically continues to change the color temperature output as a function of brightness and in response to the illumination devices receiving the time-of-day signal sent from the timer. Automatic emulation and the automatically changing of color temperatures as a function of brightness and time of day occurs without the user actuating a trigger; that functionality is reserved for the manual override and not the automatic natural show.

As the angular relationship between the sun and the structure containing the plurality of illumination devices changes throughout the day, the corresponding natural show must also change. Importantly, the spectral distribution of sunlight, specifically the spectral radiance of sunlight, changes with path length between the sun and the structure. Shorter wavelengths can be more sensitive and produce greater spectral radiance at shorter path lengths than do longer wavelengths. To emulate the changes in natural sunlight conditions within an artificial lighting system, such as the present LED illumination system, or devices, the LED illumination device must change its color temperature output throughout the day based on the changing path lengths.

Figure 10:
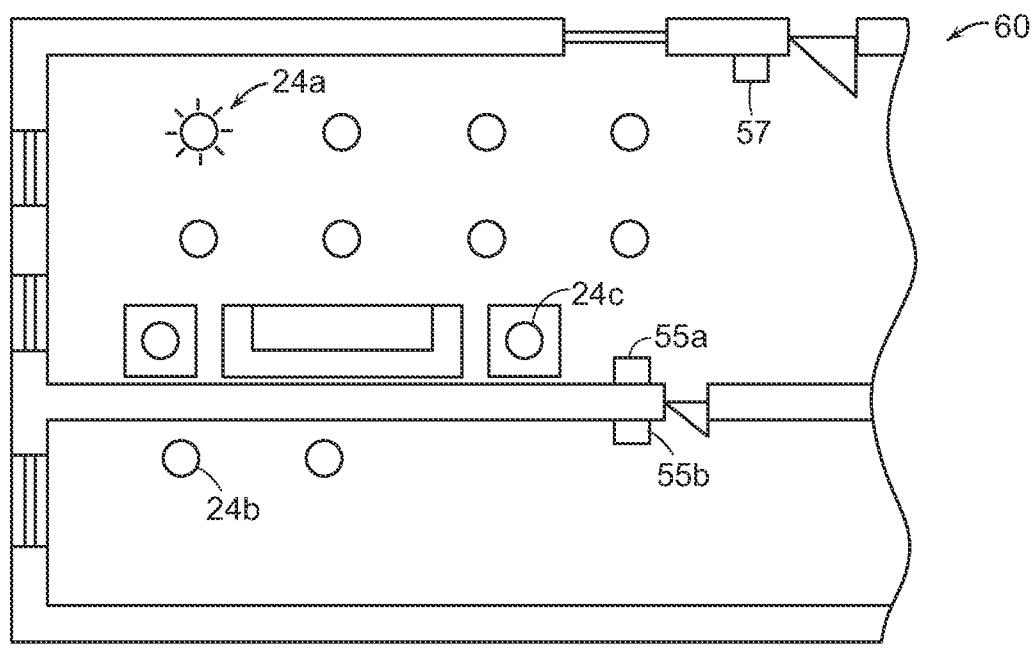
FIG. 10 is an exemplary plan diagram of a habitable structure containing a plurality of illumination devices grouped into zones, with one or more zones grouped into scenes that can be similarly controlled in both brightness and color temperature.

FIG. 10 illustrates an example of a structure 60 containing a plurality of LED illumination devices 24. LED illumination devices 24 are sometimes interchangeably referred to as LED lamps, fixtures, or luminaires. A residence may have numerous rooms, such as bedrooms, living rooms, kitchen, etc. Preferably, each LED illumination device 24 comprises at least one LED, and more preferably, several LED chains 28, where each chain can produce a corresponding color within a chromaticity region. Illumination devices 24 can include PAR illumination devices shown as downlights 24a within, for example, a living room, and other PAR illumination devices 24b as downlights within, for example, a bedroom. The living room can have multiple downlights labeled 24a, whereas the bedroom can have multiple downlights labeled 24b. Next to the couch within, for example, the living room, are tables on which, for example, A20 illumination devices 24c can be configured.

Each illumination device 24 communicates with the remote controller 53, the keypad 55, and other illumination devices via the communication interface 52 using a communication protocol described above as, for example, Zig-Bee, as well as possibly WPAN using IEEE 802.15.4. The LED illumination devices 24 can therefore wirelessly communicate with each other, as well as with the remote controller 53 and physical keypad 55. A keypad 55 controls a group of LED illumination devices. For example, a physical keypad 55a can be placed in a living room to control the group of illumination devices within the living room, whereas another keypad 55b can be placed in a bedroom to control the LED illumination devices within the bedroom.

The keypads within structure 60, labeled 55a, 55b, are generally referred to as physical keypads. As will be noted later, the physical keypads can be represented by virtual keypad icons shown on a GUI, such as the GUI of remote controller 53. Likewise, the physical illumination devices 24a, 24b, 24c within a structure 60 of FIG. 10 can also be represented as virtual illumination device icons on a GUI of, for example, remote controller 53. The virtual illumination devices and keypads shown on a GUI can appear to look like the corresponding physical illumination devices and keypads and can be used not only for grouping purposes but also for provisioning the functionality of each of the physical illumination devices when instilling the data sets and control functionality within the storage medium 56 of each LED illumination device within a group that is controlled by the physical keypad 55. In addition to the physical illumination devices and physical keypads arranged throughout a structure, a global keypad 57 can be configured near, for example, a common area such as the entry doorway of a structure for globally controlling multiple zones and/or scenes throughout the structure as will be described herein below.

Figure 11:
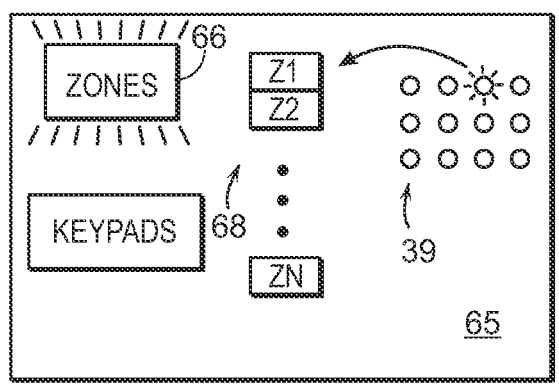
FIG. 11 is an exemplary GUI provided on the remote controller of FIG. 9 illustrating the grouping of physical illumination devices into zones and shown on the GUI as virtual illumination devices that can be dragged and dropped into corresponding zones.

Turning now to FIG. 11, a GUI 65 can be presented on a display screen of remote controller 53. GUI 65 illustrates one example in which the actual physical LED illumination devices arranged throughout structure 60, shown in FIG. 10, can be grouped based on their location and function. The mechanism for providing the grouping as well as the function of the illumination devices will be disclosed below when describing the grouping mechanism as well as the scene/show assignment mechanism. For example, a location—such as a bathroom—can have different groups of illumination devices 24, with each group being associated with a zone. Moreover, the physical LED illumination devices of one or more groups can be further grouped into a scene. For example, the simplest form of a scene is a half bath within a structure 60 having two zones. A first zone can be associated with the vanity of the half bath, and a second zone can be associated with overhead lights of the half bath. The first and second zones can be combined into a scene that accounts for all the LED illumination devices within the half bathroom.

FIG. 11 illustrates one embodiment in which after all the physical illumination devices 24 and physical keypads 55, 57 are installed in a structure, the physical illumination devices and keypads are discovered. The discovery process involves moving the remote controller 53 around the structure when a user instructs the remote controller 53 on the GUI of the remote controller 53 to discover all devices (illumination devices and keypads) throughout the structure. The discovery process occurs through a command on the GUI 65 of the controller, and the dongle of the remote controller 53 then broadcasts a message instructing all illumination devices and keypads that receive the message, either directly or through any number of hops, to respond with their unique ID number, often referred to as the MAC address. The unique MAC address of each of the illumination devices and keypads is sent back to the remote controller 53. If the remote controller 53 is a personal computer or a phone having a screen, it will display on the screen a set of GUI icons, where each icon is associated with a corresponding physical illumination device or keypad. Moreover, the MAC addresses sent back to the remote controller identify whether the discovered device is an illumination device or a keypad. Also, knowing where each MAC address is installed in the structure, the icons representing virtual illumination devices and virtual keypads will correspond to their respective physical illumination devices and physical keypads that have responded.

For example, as shown in FIG. 11, in an installation with sixteen PAR illumination devices 24 in a room or the entire structure, sixteen virtual illumination devices 39, or icons 39, will appear. The virtual keypads will appear at a later step also as icons on a subsequent GUI. An indication that all the illumination devices have been discovered occurs when an acknowledge message is sent back from each of the physical illumination devices 24 to the remote controller 53. This will then cause each LED illumination device to turn a detectable color, such as blue, and each keypad that is also discovered will blink. Each of the discovered illumination devices and keypads will appear as virtual illumination devices 39 and virtual keypads on the GUI. If all the LED illumination devices do not turn, for example, blue or the physical keypads blink upon user inspection by walking around the structure, not all acknowledge messages have been returned and thus the missing acknowledge message of the unique MAC address would indicate a non-blue LED illumination device or keypad has not been discovered. Remedial measures would then need to be taken, as described below. However, if all illumination devices turn blue and the physical keypads blink upon inspection, then the corresponding virtual illumination devices and keypads will appear on the GUI.

After all the physical LED illumination devices 24 and the physical keypads 55, 57 have been discovered, the next step is grouping. In the grouping procedure, physical illumination devices that need to be controlled together are assigned a specific group address. As shown in FIG. 11, during the grouping mechanism, group addresses are downloaded into storage medium 56 of each of the illumination devices within that group. Therefore, during a control mechanism, a single button actuation of a physical keypad 55 will cause a control message to be sent from the keypad 55 to address via a single groupcast message all the unique MAC addresses associated to that unique group address. The groupcast message will then launch the content associated with that addressed group of physical illumination devices 24 via a microprocessor fetch mechanism.

There can be different types of remote controllers 53. A remote controller 53 can simply include a dongle with a USB interface and radio plugged into the USB port of a mobile device. If remote controller 53 is to communicate through a hub or bridge, then remote controller 53 communicates using a different protocol than the protocol with which the various illumination devices 24 communicate with each other as well as the keypad 55, 57. As will be noted herein below, the term "illumination device" or "LED illumination device" refers to the physical device, whereas whenever the use of the term "virtual" is used, that term refers to the icon representation of the physical illumination device or physical keypad on a GUI. The representation, icon, or virtual depiction on the GUI is not the physical device but nonetheless each virtual depiction corresponds to a physical device.

During the discovery phase, when the broadcast discovery signal is sent from remote controller 53 through the mesh network from hop-to-hop with corresponding acknowledge-back, a routing table is formed. The broadcast discovery and acknowledge-back that forms the routing table does so having a destination address and a next-hop address for each of the LED illumination devices. The routing table is stored in the storage medium of each of the LED illumination devices 24 throughout the structure 60, along with what is described later as the group addresses and the content associated with each group address. The group address and content comprise a groupcast table. An example of the mechanism for forming a groupcast table with data set content associated with a group of illumination devices as stored in the storage medium of each illumination device with a group is set forth in commonly-assigned U.S. patent application Ser. No. 15/041,166, which is herein incorporated by reference in its entirety.

The discovery process by which all the LED illumination devices and keypads throughout the structure are found and displayed in the corresponding GUIs of a remote controller is typically only done once when the illumination devices and keypads are installed in the structure. However, if an LED illumination device 24 or a keypad 55 is replaced, that illumination device or keypad can have a different mapped address, and thus the discovery process must be repeated anytime the illumination system is modified. The structure of the illumination system, and thus the network of illumination devices and keypads, is not predetermined by installation like the cabling network of a wired network. Instead, it may be determined by the plurality of physical conditions, like the distance or shielding materials between neighbored illumination devices, walls, or other devices between the illumination devices 24, or even by electromagnetic interference by electric appliances or other devices within the structure 60.

To compute the network configuration, the broadcast is preferably triggered by the remote controller 53. The broadcast message is transmitted by addressing the messages to a pre-defined broadcast address, to which all physical devices (LED illumination devices 24 and keypads 55, 57) are listening. For example, the broadcast signal can be received first by those devices that are near the remote controller 53. Those illumination devices 24 can then forward the broadcast message to other illumination devices, which further forward the messages to even further distal illumination devices via the aforesaid hop mechanism. The acknowledge-back signal can be transmitted as a unicast or direct message back to the remote controller 53 that sent the broadcast. Each illumination device 24 that sends such a unicast message must receive an acknowledge to prevent such illumination devices from resending the same message. Thus, the return acknowledge reply is sent by the remote controller 53 back through the mesh network, also as a unicast message.

During the discovery process, it is fairly time consuming to broadcast, receive, and acknowledge back, and thereafter send an acknowledge reply. However, since the discovery process happens infrequently, and only generally during the configuration of the illumination system during initial install or replacement, a time consumptive discovery process that takes multiple seconds is generally acceptable to the user.

Turning back to FIG. 11, after the discovery process is complete, and all the LED illumination devices 24 and keypads 55 have been discovered and represented on a GUI of remote controller 53, grouping can then begin. On the left-hand portion of GUI 65 is an icon that represents either zones or keypads. When the zone icon is selected, as indicated, a series of zones Z1, Z2, etc., can appear as shown by numeral 68. The zones icons 68 are not named until a user provides a name, and at this stage can simply be labeled Z1, Z2, etc., such as a default name given to the zone icons 68. At some point, however, the zones can be given a name and, using the very simple example described above, there may only be two zones associated with a half bath, where the zones can be labeled first bathroom vanity and first bathroom overhead light.

As further shown in FIG. 11, after the illumination devices 24 have been discovered and appear as virtual illumination devices 39 in the right portion of GUI 65, one or more LED illumination devices 24 can be grouped by clicking on the corresponding virtual illumination device 39 on the GUI, and that virtual illumination device 39 may blink or change to a different color. The corresponding physical illumination device 24 associated with the clicked-on virtual illumination device may also change color, or blink. In this fashion, the user will then know the correspondence between a virtual illumination device 39 and its associated physical illumination device 24 within the structure.

In the above example, there may be two A20 illumination devices in the half-bath vanity, and two PAR38 illumination devices in the overhead light. The user may wish to control these two groups of LED illumination devices 24 independently so that the vanity may illuminate separate from the overhead light. Thus, when the remote controller 53 is brought into the half bathroom, and the four virtual illumination devices 39 appear on GUI 65, a user can click on one of the virtual illumination devices and a corresponding light in, for example, the vanity, may blink. The user can then simply drag and drop the virtual illumination device 39 corresponding to one of the lights in the vanity into zone 1, Z1. The same is repeated for the remaining three lights, with the vanity lights grouped into zone 1, and the overhead lights grouped into zone 2, Z2. The benefit of being able to visually detect blinking icons and their corresponding blinking physical illumination devices 24, and then based on where the LED illumination devices 24 reside within the structure, dragging and dropping the virtual illumination device in the appropriate zone, is a key feature conveniently carried out using the remote controller 53. The drag-and-drop feature upon a GUI having a touch screen user actuation thereof can be effectuated by a simple download of an application onto the mobile device that constitutes the remote controller 53. That application can further allow the user to name the various zones on the GUI 65 for simple reference as to which group of LED illumination devices are controlled by a keypad which controls that zone.

Figure 12:
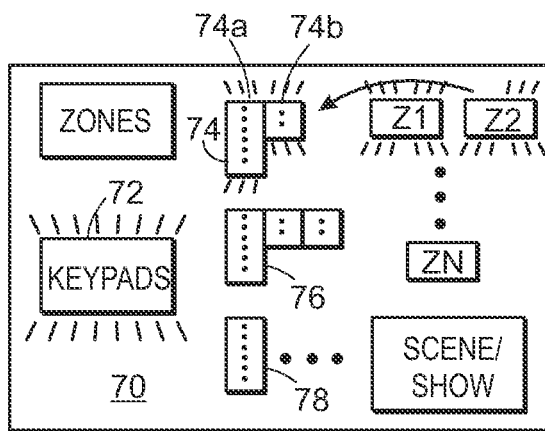
FIG. 12 is an exemplary GUI provided on the remote controller of FIG. 9 illustrating the assignment of zones to keypads so that buttons of a keypad can control physical illumination devices grouped into zones assigned to that keypad.

Assigning zones to keypads is therefore the next step and is illustrated in GUI 70 of FIG. 12. For example, in the half-bathroom scenario with two zones, a keypad 55 can exist near a doorway within that bathroom. Configuring a particular keypad begins by selecting a keypad icon 72 in the left portion of GUI 70. That virtual keypad can be identified as the bathroom keypad, for example, if in the half-bathroom scenario physical keypad 55 in the half bath begins blinking when a particular virtual keypad 74 among a plurality of keypads also blinks. Thus, the procedure is that if keypad 72 is identified by a user clicking on keypad icon 72, a plurality of keypads will appear in the middle portion of GUI 70. If a user clicks on keypad 74 from among the plurality of keypads, and that selected virtual keypad 74 corresponds to the MAC address of the physical keypad within, for example, the half bathroom, then the half-bathroom physical keypad will blink corresponding to blinking of the virtual keypad 74 representing that half-bathroom physical keypad 55. As an alternative to blinking, some other form of visual indication can also be implemented, such as a change in color or, possibly, an audible signal can be sent from the corresponding physical keypad 55. Regardless of the indication, whether visual or audible, some correspondence is detected between a virtual keypad 74 and the keypad within the structure.

If the keypad within the structure is the half-bath keypad 55 used to control two zones, that bathroom keypad 55 comprises two portions. The two portions are shown as the virtual keypad icon 74 identical to what would appear in the physical keypad, with the first portion noted as 74a and the second portion as 74b. The first portion of the physical keypad is associated with a first gang of a two-gang switchbox and comprises, for example, seven buttons, whereas the second portion 74b comprises two buttons. As will be described below, the first portion controls, among other items, brightness of zone 1 associated with the half-bath vanity, whereas the second portion 74b controls only brightness of the second zone associated with the half-bath overhead light, using the above simple example. GUI 70 of remote controller 53 shown in FIG. 12 not only allows for selection of keypads, but also assignment of zones in which a plurality of keypads are grouped to each of the selected keypads and portions thereof. While the first portion is associated with a first gang of a two-gang switchbox, a second portion can be associated with a second gang of the two-gang switchbox. If a keypad is to control more than two zones, then the corresponding switchbox would be a multi-gang switchbox, with each zone of multiple zones assigned to a corresponding gang so that the zones can be controlled individually. As shown on the GUI 70 of FIG. 12, the virtual keypad 76 can correspond to a keypad 55 for controlling three zones, possibly within a den or living room of the structure 60. Virtual keypad 78 can have almost unlimited multi-gang switchbox to control multiple zones well beyond three. In the simple example of a half bath with only two zones, then a two-gang switchbox for controlling individually only two zones is sufficient, and the virtual icon 74 represents the keypad 55 within only the half bath.

Figure 13:
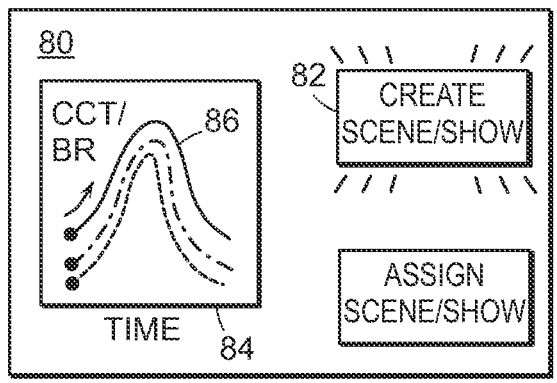
FIG. 13 is an exemplary GUI provided on the remote controller of FIG. 9 illustrating the creation of a scene, or a series of scenes corresponding to one or more zones, and that can change over time to form a natural show having a color temperature that is a function of both brightness and the time of day.

After LED illumination devices are grouped into zones, and the zones assigned to corresponding portions of identified keypads, scenes and shows can be created. As shown in FIG. 13, GUI 80 presents a create scene/show icon 82. When a user clicks on icon 82, a window 84 of GUI 80 appears. Within that window 84, one or more dimcurves can be created. Beginning with a first dimcurve, such as a full-brightness dimcurve 86, of a particular zone or scene is created. In the example of FIG. 12, zones 1 and 2 (and the combination thereof that form a scene) are assigned to the physical keypad corresponding to icon 74, and content data sets of color temperature as a function of brightness, beginning with full brightness are mapped along a dimcurve 86 containing a plurality of scene illuminations (scene A, scene B, scene C, etc.). Thus, color temperature and brightness values at specific times of day to form scene A is created solely as to zones 1 and 2 of the half-bath example. The process is repeated to produce another scene B at another point along dimcurve 86. There may then be several scenes formed along dimcurve 86 through the daytime, as well as nighttime, by simply pointing to a brightness/color temperature value at a particular time of day on the screen 84 and the remote controller therefore forwards the corresponding scene to the corresponding group of illumination devices for storage as scene A, followed by scene B, etc., within the storage medium 56 of the entire group of selected plurality of illumination devices. For a full-brightness value, and as color temperatures assigned to scenes A, B, C, etc., increase to a peak and thereafter decrease, the increasing scenes are placed along the full-brightness dimcurve 86 to the peak, and thereafter subsequent scenes are placed in a decreasing portion of the dimcurve 86. Thus, the various scenes (scene A, scene B, scene C, etc.) of increasing color temperature at a full brightness forms the first dimcurve to, for example, the apex of the dimcurve at noontime to decreasing color temperatures for subsequent scenes from the apex down to the evening hours and possibly through nighttime along the time axis shown in window 84. This process of mapping scenes along a dimcurve for a particular group of illumination devices and repeating the process for creating other dimcurves for that group thereby forms the entire mapping for a particular group of illumination devices 24 within the structure 60. The process is then repeated to create multiple scenes along multiple dimcurves for the remaining groups of illumination devices 24 within the structure 60.

Color temperatures as a function of brightness and time of day are mapped along multiple dimcurves for each zone or group of zones (scene comprising illumination devices) throughout the structure so that the mapping is that of a table of color temperature and brightness values for each scene among a plurality of scenes and for each dimcurve within a plurality of dimcurves assigned to each zone or scene arranged throughout the structure. Thus, the half-bath example having two zones and a single scene of two zones would have multiple scenes with corresponding color temperatures as a function of brightness mapped along multiple dimcurves. Mapping would continue for other rooms throughout the structure. As noted above, a scene represents not only a plurality of one or more zones of illumination devices, but also represents the color temperature as a function of brightness at a particular time of day mapped along a dimcurve of a series of scenes separated in time to form a natural show, with each natural show corresponding to a dimcurve and multiple dimcurves to represent different natural shows available to the two-zone, or single-scene illumination devices half-bath example.

Figure 14:
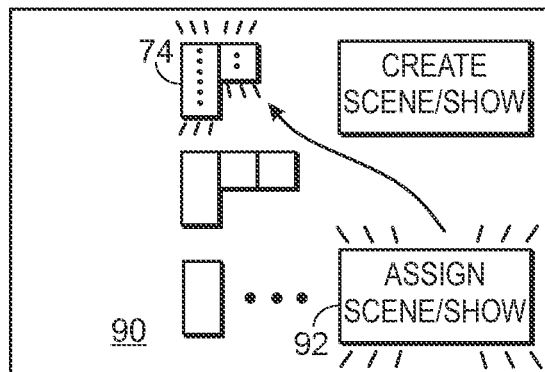
FIG. 14 is an exemplary GUI provided on the remote controller of FIG. 9 illustrating the assignment of the created scene and natural show to a keypad within the structure.

Once scenes and shows are created for all the plurality of LED illumination devices among a structure, the mapped scenes along a dimcurve, of which there can be multiple dimcurves, form multiple shows that are assigned a number, or address. For example, the created scenes and shows attributable to the half bath used to control two zones can be assigned an address for each possible scene mapped along the various dimcurves, and for each dimcurve or show. That number, or address, can then be selected in GUI 90 shown in FIG. 14 by clicking on icon 92, and thereafter displaying the addressed scenes and show numbers, and dragging and dropping those addressed numbers to the virtual keypad 74, corresponding, for example, to the half-bath physical keypad 55. Using the half-bath scenario, the color temperatures as a function of brightness for each scene, and for the series of scenes along multiple dimcurves attributable to the half-bath keypad, are then stored in the illumination devices addressable by the physical keypad 55 that controls zones 1 and 2. When a user depresses a button on the half-bath keypad 55, for example, various color temperatures, brightness values attributable to either zone 1, or zone 2, or both (a single scene of zone 1 and zone 2 illumination devices), can be invoked. The buttons send corresponding addressed control signals to the illumination devices to invoke a static scene or a dynamically and automatically changing series of scenes of a show. Different natural shows represented by different addressable dimcurves can also be controllably addressed by choosing the appropriate addressable control signals sent from the keypad 55 to the mapped table of different dimcurves within the illumination devices addressable by the keypad 55. The data set contents within illumination devices 24 that are controllable by the address control signals sent from the keypad 55 are the parameters needed for invoking the particular brightness and/or color temperature for those corresponding group of illumination devices, either as a particular scene from among a plurality of different scenes or as a natural show from among a plurality of natural shows along respective plurality of dimcurves.

Figure 15:
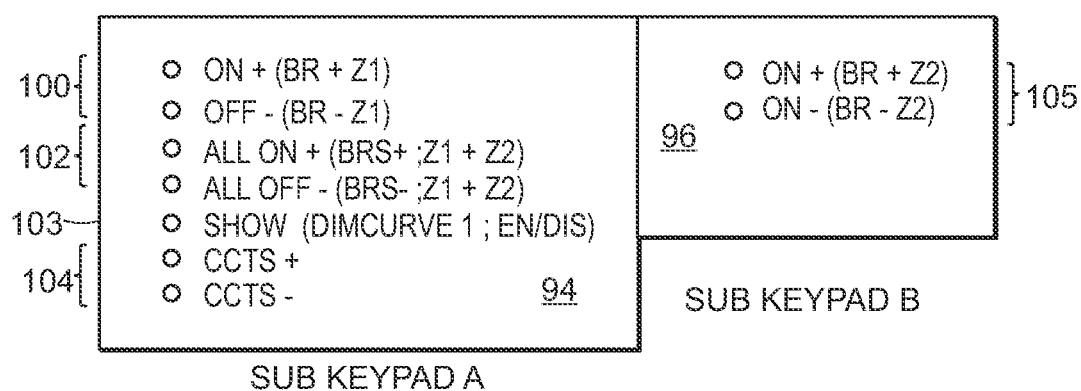
FIG. 15 is a plan view of buttons on a keypad, and the assignment of zone, scene, and natural show control to the buttons of the keypad.

Turning now to FIG. 15, buttons on an exemplary keypad 95 are shown. Although buttons can be arranged and configured in multiple different ways, the exemplary keypad 95 illustrates one configuration for adjusting brightness, color temperature, as well as enabling and disabling a show of, for example, a two-zone plurality of illumination devices. Continuing the example, keypad 95 shown in FIG. 15 can comprise two portions, a first portion 94 (sub keypad A) and a second portion 96 (sub keypad B). The first portion 94 is associated with a first gang of a two-gang switchbox, whereas the second portion 96 is associated with a second gang of a two-gang switchbox. The keypad 95 shown in the example of FIG. 15 can therefore be used in the half-bathroom scenario for controlling a zone of illumination devices associated with the vanity of the half bathroom separate from a zone of illumination devices associated with downlights within the half bathroom.

The exemplary keypad 95 of FIG. 15 includes a first of the plurality of buttons, denoted as reference numeral 100. A second of the plurality of buttons is shown as reference numeral 102, a third of the plurality of buttons is shown as reference numeral 103, and a fourth of the plurality of buttons is shown as reference numeral 104. More specifically, a first of the pair of first buttons (ON+) is coupled to turn on and increase brightness of the plurality of illumination devices within only the first zone, and a second of the pair of first buttons (OFF−) is coupled to turn off and decrease brightness of the plurality of the illumination devices within only the first zone. A first of the pair of second buttons (ALL ON+) is coupled to turn on and increase brightness of the plurality of illumination devices within an illumination scene that comprises both the first zone and the second zone. A second of the pair of second buttons (ALL OFF−) is coupled to turn off and decrease brightness of the plurality of the illumination devices within the illumination scene. A first of the pair of fourth buttons (CCTS+) is coupled to turn on and increase color temperature of the plurality of illumination devices within the illumination scene. A second of the pair of fourth buttons (CCTS−) is coupled to turn off and decrease color temperature of a plurality of illumination devices within the illumination scene. Accordingly, the first portion 94 of keypad 95 is used to control a first zone, as well as the first and second zones in, for example, the half-bath scenario that comprises two zones and a single illumination scene.

The first of the plurality of buttons, denoted as reference numeral 100, therefore increases, decreases, turns on, and turns off the brightness of only the first zone, such as, for example, the lights above the half-bath vanity. Yet, buttons 102 turn on and off and increase and decrease the illumination devices within both zone 1 and zone 2, and therefore the brightness of the entire scene comprising the lights above the vanity as well as the downlights within the half bath and are labeled as BRS. The fourth of the plurality of buttons, labeled 104, control the color temperature by increasing or decreasing the color temperature within both zones, and therefore control the color temperature of the entire scene, and are labeled as CCTS+ and CCTS−, for increasing and decreasing the color temperature of that scene.

As noted above, in the half-bath scenario that can be controlled by a two-gang switchbox, and specifically the keypad 95 having the first portion 94 for controlling the first gang and the second portion 96 for controlling the second gang, the second gang is associated with the second zone of the half bath. The first zone can be above the vanity, whereas the second zone, or Z2, can be in the downlights separate from the vanity. Thus, Z1 can be associated with the zone that controls lights above the vanity, and Z2 can be associated with the zone that controls the downlights elsewhere in the half bath. The second portion 96 of keypad 95, associated with the second gang of the two-gang switchbox, comprises a fifth of the plurality of buttons, denoted as reference numeral 105. A fifth of the plurality of buttons 105 is coupled to adjust brightness of the plurality of illumination devices within only the second zone, and not the first zone. A first button of the pair of fifth buttons 105 is coupled to turn on and increase brightness of the plurality of illumination devices within only the second zone, as noted by BR+ for the second zone Z2. A second button of the pair of fifth buttons 105 is coupled to turn off and decrease brightness of the plurality of illumination devices within only the second zone and is labeled as BR− of the second zone Z2.

The buttons on keypad 95 can be programmed in many ways, and the specific program of the first through the fifth of the plurality of buttons shown in FIG. 15 is only one way. As noted above, the programming of buttons can be performed like the grouping of illumination devices, keypads, and the creation and assignment of scenes and shows shown in FIGS. 11-14. Specifically, a GUI can exist on the remote controller 53 having brightness control, temperature control, and specifically brightness and temperature control for various zones and scenes in one portion of the GUI, and dragging and dropping those control features into specific buttons of a selected keypad. For example, the brightness, as well as the ON/OFF features for controlling brightness can exist as an object or icon upon the GUI to allow the user to drag the brightness control as well as the ON/OFF control of zone 1 into the corresponding button within the first pair of buttons 100. The same can apply for assigning control of both zones that represent a scene, and specifically the brightness control of that scene (BRS+/−) as well as turning on or off (ALL ON+/−) the entire scene using icons associated with both zones and the brightness increase and decrease control icons of the pair of second buttons 102. The same can apply to the fourth pair of buttons 104 as well as the fifth pair of buttons 105. Alternatively, the buttons can be assigned using a GUI on a display screen directly upon keypad 95. The programming of buttons to control various illumination devices within one or more zones of a structure can be achieved in various ways in firmware or using software such as software within an application program, using a GUI or not, and is generally well understood to those skilled in the art. In addition, assigning control to certain buttons to control illumination output of certain illumination devices can take on different functionality than the example described hereinabove, all of which fall within the spirit and scope of these disclosed embodiments. Moreover, depending on the number of zones, the number of gangs within a switchbox, and the overall functionality of a keypad, buttons can be programmed in numerous different ways. FIG. 15 illustrates only one form of programming specific to a two-zone example. However, it is understood that the arrangement of buttons as well as the control afforded by depressing one or more buttons can accommodate any LED illumination device lighting scenario provided the buttons can individually control the brightness of zones, or the brightness of all zones within a scene, as well as the color temperature of that scene, with the ability to turn on, off, increase, and decrease brightness and color temperature among individual zones and scenes within a structure.

Also shown in the example of the two-gang switchbox in FIG. 15 is a third of the plurality of buttons, labeled 103. The third of the plurality of buttons can be a single button 103 coupled to enable a natural show, that natural show being one which automatically and periodically changes color temperature as a function of brightness to form a different scene each time the color temperature and/or brightness changes. The automatically and periodically changing color temperature of that natural show can occur at differing times of day. By depressing button 103, a show can be enabled or disabled and, specifically, if enabled, the show would extend forward in time along, for example, a first dimcurve labeled dimcurve 1 with increasing color temperature toward noontime and decreasing thereafter. In the simple half-bathroom example, button 103 allows for periodic and dynamic changing of color temperature as a function of brightness throughout the day along a pre-set and previously mapped dimcurve to increase the color temperature above the vanity and separate downlights toward noontime and decrease thereafter. Button 103 controls the show for illumination devices within Z1 and Z2.

Figure 16:
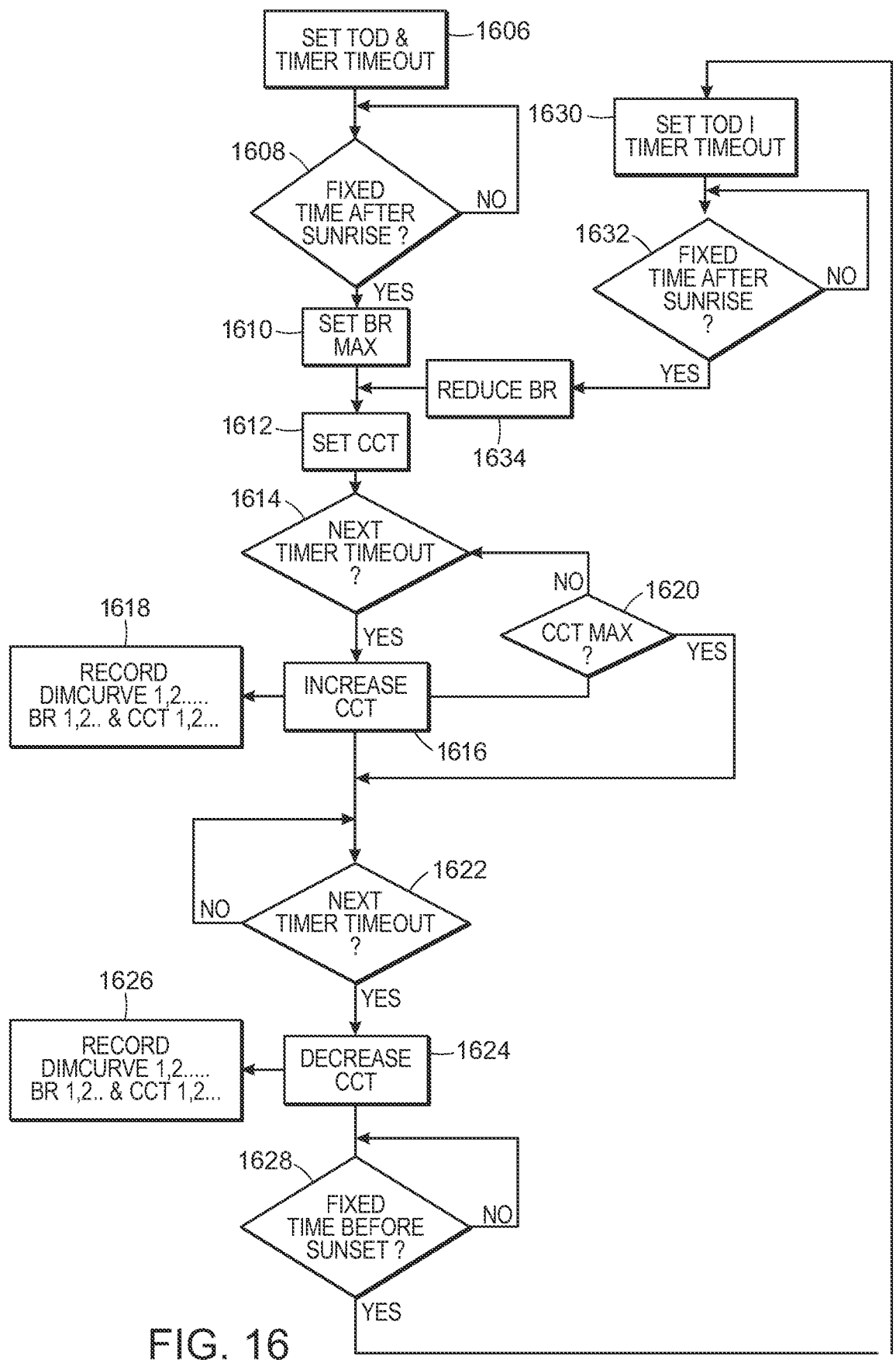
FIG. 16 is a flow diagram illustrating the generation of different dimcurves at different times of day throughout the daytime to produce a natural show of changing color temperature as a function of brightness that can be stored in the storage medium of illumination devices grouped into one or more zones, or scenes.

Turning now to FIG. 16, a flow diagram is shown illustrating the generation of different dimcurves at different times of day throughout the daytime. The different dimcurves can be applied to the same plurality of illumination devices to produce different natural shows of changing color temperatures as a function of brightness. The generation of those dimcurves occurs using the GUI shown in FIG. 13, for example, when creating various scenes, and aggregating those scenes along a dimcurve to create a natural show. The creation of the different dimcurves for the same plurality of illumination devices, and repeating the process set forth in the flow diagram of FIG. 16 can occur for other plurality of illumination devices. The creation of multiple dimcurves for each of several different groups of illumination devices occurs during the mapping or provisioning of the illumination devices. That mapping of multiple dimcurves for each of multiple groups of illumination devices forms the overall mapping functionality. Those mapped dimcurves are stored as multiple tables of brightness and color temperature values at various times of day for various groupings of illumination devices within each of those illumination device storage mediums 56. When the real-time clock within the corresponding keypad 55 sends a time-of-day value, the brightness and/or color temperature value will change to the next time-of-day addressed value for the next mapped scene if the show is enabled. If a show is not enabled, then any mapped value of a scene can be formed manually by depressing a button on the keypad 55 and that scene will remain static and unchanging until another button is depressed on the keypad, or a timeout has occurred, or the show is resumed.

The mapping and storage of brightness and color temperature charts or tables within the storage mediums begin by setting the time of day and timer timeout within the real-time clocks of the remote controller 53 as well as the various keypads 55 corresponding to respective groups of illumination devices 1606. Once the timer timeout, that can be preset, times out after a set time of day, such as a fixed time after sunrise 1608, brightness within a first group of illumination devices can be set to a maximum amount 1610. The maximum brightness can be selected from the manufacturer specification sheet, for example. If the fixed time after sunrise has not yet occurred based on the timer timeout from the time-of-day value, then the program set forth in FIG. 16 waits for that fixed time after sunrise. Beginning at the timer timeout value after sunrise, and for a maximum brightness already set, the color temperature is then set also at that maximum brightness amount and for that fixed time after sunrise 1612.

Once the maximum brightness is set and color temperature is set for the first period after sunrise, the timer timeout is examined again for the next timer timeout 1614. Once the next timer timeout, or time-of-day signal is sent from the real-time clock of the keypad after the first timeout has occurred, brightness remains at the maximum value, but the color temperature is increased 1616. At each timed increment after sunrise when the timer times out, an increase in color temperature occurs, and the recorded maximum brightness and stepped increase in color temperature is recorded to form the first dimcurve, or dimcurve 1.

A check is made to determine if the color temperature has reached a maximum amount, and if it has not, as shown by decision block 1620, then the timer proceeds to the next timeout, or time of day, and the color temperature continues to increase and the corresponding maximum brightness value and increasing color temperatures along the first dimcurve are recorded, or mapped in a table of first dimcurve values of maximum brightness and increasing color temperatures.

If the maximum color temperature has been reached as indicated by decision block 1620, then the next timer timeout 1622 must be one that produces a decrease in color temperature 1624, with a corresponding recordation of a decrease in color temperature as a function of maximum brightness along the first dimcurve 1626. Accordingly, the first dimcurve (dimcurve 1) indicates at fixed time intervals and increasing color temperature for the maximum brightness until a maximum color temperature is reached and thereafter a periodic decrease in color temperature for that maximum brightness. The increasing and thereafter decreasing color temperature for maximum brightness is mapped within a table that is stored in the storage medium of each of the group of illumination devices, that group being the first group of illumination devices. If a fixed time before sunrise has not occurred 1628, then the process of looking for that timer timeout continues until such time as sunset occurs 1630.

The time of day and timer timeout is therefore reset 1630 to examine again whether a fixed time after sunset 1632 has occurred. If a fixed time after sunrise has occurred, then the brightness is reduced from the set maximum brightness value, as shown by block 1634. The process is therefore repeated beginning at the fixed time after sunrise of increasing color temperature until a maximum color temperature is reached, and thereafter decreasing the color temperature to a fixed time before sunset, albeit for a reduced brightness, to form a second dimcurve (dimcurve 2). Accordingly, the mapped table of brightness values and color temperatures between sunrise and sunset are stored in the storage medium of the first group of illumination devices containing a first mapped table of a first dimcurve, followed by a second dimcurve. The only difference between the first and second dimcurve, however, is the reduction in brightness value, whereby the second dimcurve has a lower brightness value than the first dimcurve.

At regular periodic timed intervals along each of the first, second, third, etc., dimcurves associated with the first group of illumination devices are color temperatures as a function of brightness. Those color temperatures increase from sunrise to approximately noontime, and thereafter decrease to sunset. If charted on a graph, the dimcurves would be those that appear on GUI 80 shown in FIG. 13, and in more detail shown in FIG. 6. There can be numerous dimcurves that are mapped and stored as numerous tables within the first group of illumination devices.

The flow diagram set forth in the software instructions of FIG. 16 is repeated not only to form multiple dimcurves within the same first group of illumination devices, but also is repeated for a second group of illumination devices, followed by a third group of illumination devices, and so forth, until all groups of illumination devices receive mapped dimcurves throughout the structure. Thus, repetition of the program instructions set forth in FIG. 16 causes mapping of various dimcurves in a second group of illumination devices, possibly the same or different mappings with different dimcurves in the second group than the first group, and so forth. Each group of a plurality of illumination devices can be different from one another within a structure, with preferably unique dimcurves associated with corresponding groups of illumination devices to control the natural show along one dimcurve of one group of illumination devices different from that of the natural show along, for example, another dimcurve within another group of illumination devices. In this fashion, for example, the natural show selected for a bedroom can be different from the natural show selected within a kitchen. Not only can the dimcurves (i.e., the color temperature as a function of brightness) be different in the bedroom versus the kitchen, but the times in which the timer timeout occurs to set the different scenes can also change. Thus, the color temperature as a function of brightness, as well as the timer timeout intervals can be different from one group of illumination devices to that of another, with corresponding mappings of tables for color temperature as a function of brightness and times of day can be different from one room to another. FIG. 16 therefore illustrates the general process by which software can be used to instruct the formation of dimcurves and different corresponding natural shows for different groups of illumination devices within a structure. The mappings or tables stored in the storage mediums of one group of illumination devices can be altogether different from the stored mappings within another group of illumination devices to control the natural show differently in one room from that of another since the dimcurves and scene-change time intervals of each room can be different.

Figure 17:
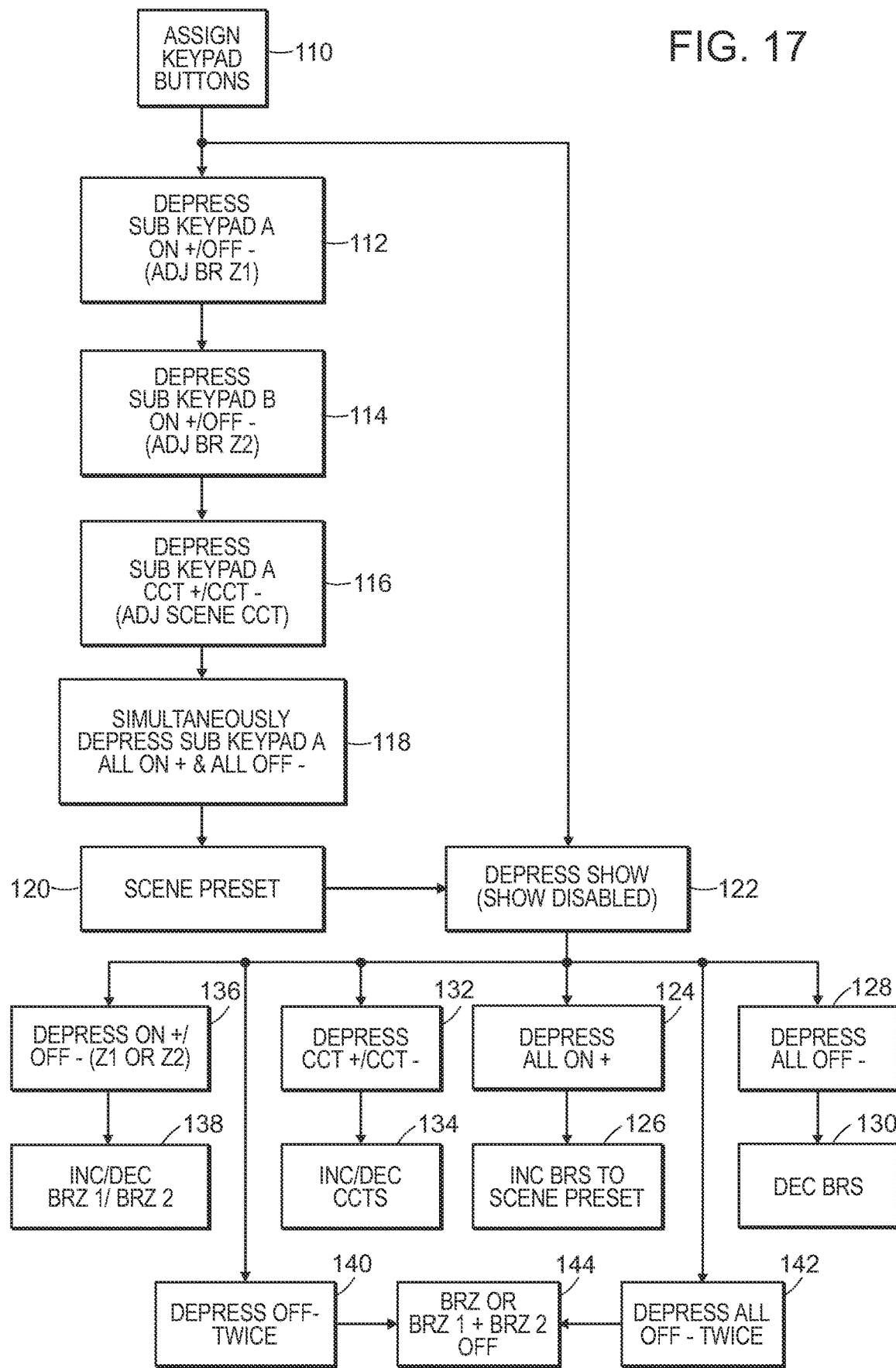
FIG. 17 is a flow diagram illustrating the programming of a preset scene brightness value, increasing brightness of zones within the scene to the preset scene brightness value, and decreasing brightness of illumination devices within the scene, a zone within the scene, or increasing/decreasing color temperature of illumination devices within the scene.

Turning now to FIG. 17, a flow diagram is shown that illustrates the programming of a pre-set scene brightness value, increasing brightness of zones within the scene to the pre-set scene of brightness value, and decreasing brightness of illumination devices within the scene, within a zone of a scene, or increasing/decreasing color temperature of illumination devices within that scene. FIG. 17 illustrates the initial assignment of keypad buttons 100. The initial assignment of buttons can be like the example described in FIG. 15 of keypad 95. Presetting a scene begins by adjusting the brightness and color temperatures of a scene applicable to one or more zones of illumination devices by first depressing the ON+ or OFF− button of the first plurality of buttons 100, as shown by block 112. Specifically, a user, using the example of FIG. 15, would depress and hold either the ON+ or the OFF− button within the first portion of keypad 95. Depending upon the amount of time that the button is depressed and held, the brightness of the first zone, Z1, will be adjusted upward or downward. Depressing the appropriate button beginning at block 112 assumes that the show button 103 is not depressed, and therefore the natural show is not enabled. Presetting a scene is therefore performed with the show being off. Next, in block 114, the second portion of keypad 95 has the fifth of the plurality of buttons 105 and, when the first of the pair of buttons 105 is depressed and held (ON+), the brightness of zone 2, Z2, increases. If, on the other hand, the second of the pair of buttons 105 is depressed and held (OFF−), the brightness of zone 2, Z2, is decreased. Next, in block 116, the color temperatures (CCT+/−) can be increased or decreased for a zone by depressing and holding the appropriate button of the fourth of the plurality of buttons 104. If CCT+ is depressed, then the color temperature of the scene will be increased, whereas if CCT− is depressed, then the color temperature of the scene will be decreased.

Once the brightness value is increased or decreased to the appropriate level either in the first zone or the second zone, and the color temperature of both zones which form the scene is adjusted to the appropriate level as noted in blocks 112, 114, and 116, then both buttons of the second of the plurality of buttons 102 are depressed simultaneously in block 118. Depressing both buttons in the second of the plurality of buttons 102, and specifically the ALL ON+ and ALL OFF− buttons, then the brightness and color temperatures of each zone and the entire scene can be pre-set at block 120. Simultaneous depression must occur for at least three seconds to pre-set the scene to whatever levels are established by blocks 112-116.

The process set forth in blocks 112-120 can be repeated for other zones and scenes throughout the structure to pre-set the brightness and/or color temperatures for respective zones and scenes throughout the house. However, presetting a scene to a particular brightness and color temperature assumes that the show is not enabled, and therefore button 103 has not been depressed. A light next to button 103 indicating a show is on, is off. Once the show is disabled for a group of illumination devices controlled by a particular keypad, the illumination devices can be pre-set by depressing the appropriate buttons of the keypad controlling those illumination devices and therefore presetting the brightness and/or color temperature of the illumination devices to a particular level, and the process is repeated for other groups of illumination devices throughout the structure.

With a scene illumination output pre-set, whether simply one group of illumination devices or multiple groups of illumination devices throughout the structure, the show must remain disabled as indicated by block 122, and any subsequent depression of the ALL ON+ button will increase the brightness of the scene to the scene pre-set value, as shown by blocks 124 and 126. The scene pre-set value can include the brightness and/or color temperatures of the scene established by blocks 112-116.

At any time when the show is disabled 122, the ALL OFF− button 102 can be depressed as shown by block 128, and the corresponding brightness of the scene will be decreased 130. Moreover, any depression and holding of the color temperature button, either CCT+ or CCT− in block 132 will increase or decrease the color temperature of the scene 134. The zones can also be individually controlled, and if the show is disabled 122, either zone 1 or zone 2 can be increased or decreased in brightness by depressing and holding the appropriate button within the first plurality of buttons 100 or the fifth plurality of buttons 105, shown by block 136 to increase or decrease the brightness of the corresponding zone 138.

The blocks shown in FIG. 17 describing depression of a button denote the depression and holding of that button and, based on the length of time the button is held, the brightness or color temperature will increase or decrease more or less, respectively. If, however, a button is depressed twice in succession, with a release of the button during the interim, a brightness of a zone, or both zones of illumination devices will be turned on or off depending on which button is depressed. The button must be depressed twice within less than a three second window with a complete release in the interim. For example, if the OFF− button of the fifth plurality of buttons 105 is depressed twice 140, then the zone 2 illumination devices will be turned off. Likewise, if the OFF− button on the first portion pertaining to the first plurality of buttons 100 is depressed twice, then the illumination devices in zone 1 will be turned off. If, however, the ALL OFF− is depressed twice 142, then the illumination devices of both zones 1 and zone 2 will be turned off. The selective turning off of zone 1, or zone 2, or both zones, depending on which button is depressed twice within approximately three seconds, culminates in the block shown as block number 144.

Figure 18:
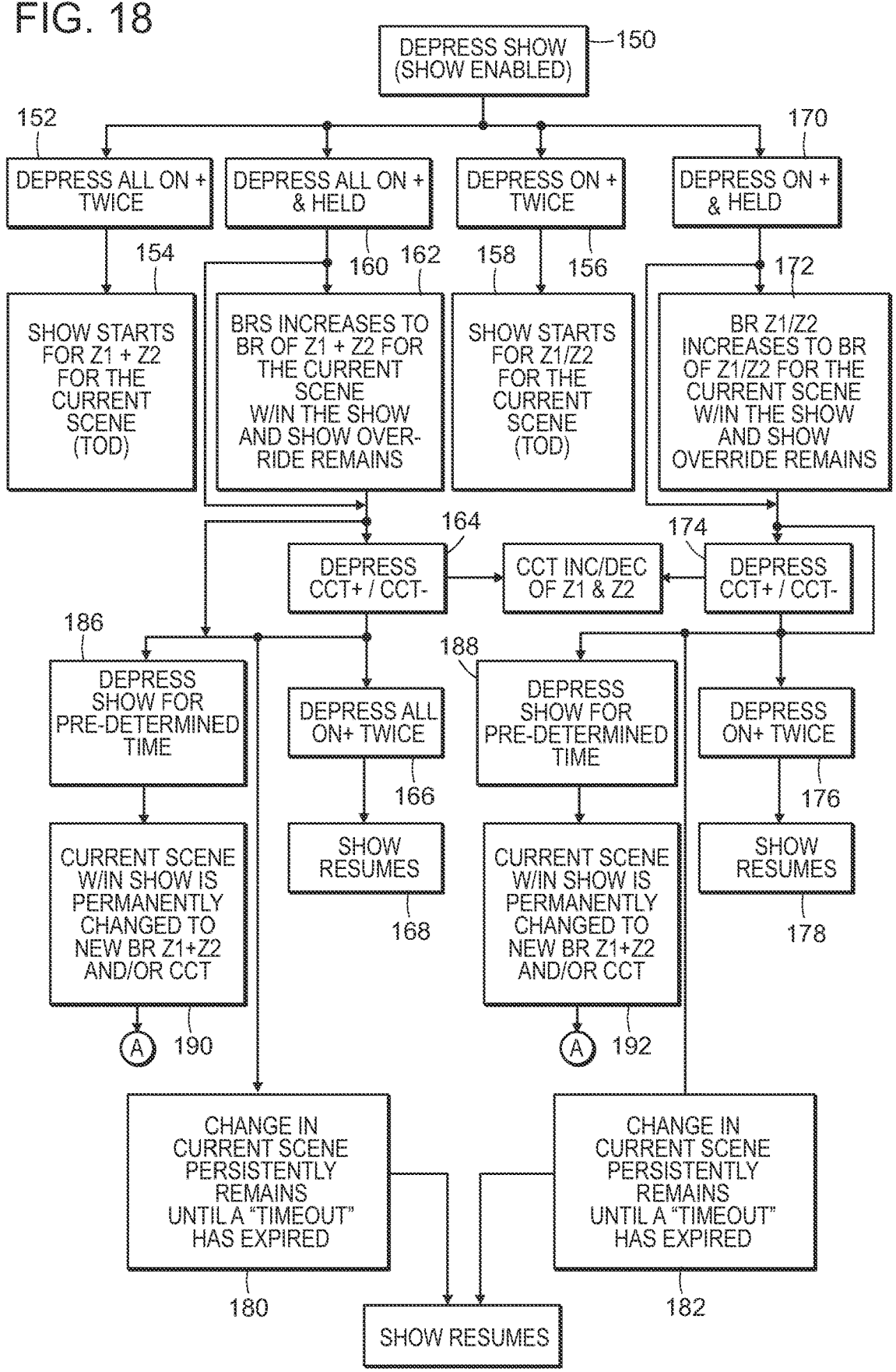
FIG. 18 is a flow diagram illustrating the initiation of a natural show among a zone or scene, and the momentary, persistent, or permanent modification of the natural show.

Turning now to FIG. 18, a flow diagram is provided showing the initiation of a natural show among either a zone or a group of zones that form a scene. FIG. 18 also illustrates the momentary, persistent, or permanent modification of a natural show. Beginning with enabling the natural show 150 by depressing the button 103 shown in FIG. 15, an indicator light is illuminated preferably next to that button, or the button itself. The indicator light indicates the show is enabled allowing either the activation of the show or an override of the show. Activation of the show depends upon the time of day and, depending on which button is depressed, either the show is activated for one or more zones. For example, if the ALL ON+ button is depressed twice 152, the scene that comprises two zones is activated and the brightness and color temperature for that scene, depending upon the time of day the button is depressed twice, is initiated. The show then starts at that current scene based on the time of day 154 at which the button is depressed.

Alternatively, the brightness and color temperature values can be set for only one zone of multiple zones of illumination devices within a scene by depressing the ON+ button twice 156. The show will then start to be automatically defined in fixed scene for that show depending upon the time of day and, specifically for either the first zone or the second zone depending upon which ON+ button 100 or 105 is depressed. That show will start for the current scene and specifically for the particular zone as shown by block 158.

It may be desirable to momentarily, persistently, or permanently modify or override a show. For example, if the ALL ON+ button 102 is depressed and held, but not depressed twice, as shown in block 160 either the brightness of the scene for that time of day, the color temperature for that time of day, or both, are increased to the brightness and color temperature values set for that scene at that particular time of day, and up to those values depending on how long the ALL ON+ button is depressed, as shown by blocks 162 and 164. Since the ALL ON+ button was not depressed twice, but is only depressed and held, the amount in which that button is held will determine the amount by which the brightness of the scene at that time of day in which the button was depressed will be increased, the same can be said for the color temperature depending upon the amount of time in which the CCTS+ button 104 is depressed. Conversely, the color temperature can be decreased depending upon the amount of time in which CCTS− button is held thereby decreasing color temperature proportional to that amount of time. The flow 160, 162, and 164 illustrates the override of the show by not activating the show but increasing or possibly decreasing the brightness and color temperature for that particular scene at that particular time within the show. For example, a user may wish to reduce the brightness in the kitchen during midday by depressing the ALL OFF− to decrease the brightness within the kitchen at 11:00 a.m. and therefore change the scene that would normally appear at 11:00 a.m. Additionally, the user may wish to decrease the color temperature by depressing the CCTS− button at 11:00 a.m. to more of an incandescent, warm white than the normally present natural white color temperature. Conversely, the brightness of the kitchen scene can also be increased as well as the color temperature by simply depressing the ALL ON+ by depressing and holding the ALL ON+ for a particular amount of time and therefore increasing the brightness at, for example, 7:00 a.m. from a lower dimcurve value to a higher dimcurve value and therefore also increasing the color temperature from, for example, 2300 K to 3000 K. Thus, the block 160 can pertain to depressing the ALL ON+ or the ALL OFF− button to increase, or decrease, brightness for the current scene at that time of day and to override the show, and to maintain that override until, for example, the ALL ON button 102 is depressed twice 166 to then resume the show 168. The flow, beginning at block 160 and ending at block 168, indicates a momentary override of the natural show, if the natural show was previously enabled. When the all ON+/- is depressed and held, the brightness of the first zone or both zones (both zones within the scene) ramp up or down in brightness. If the ALL ON+ is depressed and held, the ramp up will be that which occurs until the natural show brightness is reached for that particular time of day. Subsequently, the ALL ON buttons will operate as if the natural show is OFF to override the show. It is not until the ALL ON+ button is thereafter depressed twice will the show resume. In the interim, however, the momentary override occurs, and that override can allow manual control of both in brightness and/or color temperature up to a natural show brightness and color temperature for that time of day, or down to zero.

The control of multiple zones of a scene, and the momentary override of a show set forth in flow 160-168 is replicated in blocks 170-178. Specifically, the only difference between blocks 160-168 and blocks 170-178 is the control of one zone, rather than the control of possibly multiple zones. The blocks 170-178 pertain to the control of a single zone, whether that control is of zone one, or zone two. Contrary to the ALL ON+/- button, there also can exist an ON+/- button and, depending on whether the button being depressed and held is the button on the first portion or the second portion, either the first zone or the second zone can undergo a momentary override. If the ON+ button is depressed and held, the amount of time in which that button is held in block 170 will dictate the amount of increase of brightness for that zone, whether the first zone or the second zone, is increased for the current scene within the show. That amount of increase will extend upward to the brightness of the show at that time of day in which the button was depressed and held. Conversely, the ON- button can be depressed and held to decrease the brightness for the current scene within the show and to maintain that override and to momentary maintain that override until the button is again depressed twice 176. Color temperature for a particular zone depending upon which button was depressed, either the button of the first zone or the button of the second zone, to increase or decrease color temperature 174 again, until the ON+ button is depressed twice and the show resumes, at blocks 176 and 178. Like the scene momentary override in flow 160-168, the zone override within a particular scene at a particular time of day at blocks 170-178 exists until the show is resumed, and the amount of override or change in either brightness and/or color temperature depends upon the amount of time in which the ON+/- or CCT+/- buttons are depressed. Until the ALL ON+ or the ON+ button is depressed twice, the brightness increase/decrease and color temperature increase/decrease buttons will operate as if the natural show was not on. That is, until the ALL ON+ or the ON+ buttons are depressed twice. The override of the current scene of multiple zones, or simply a single zone occurs either momentarily until the ALL ON+ or ON+ buttons are depressed twice. However, if the ALL ON+ or ON+ buttons are not depressed within a timeout period, the change in the current scene will automatically revert to the show once that timeout has expired. Thus, FIG. 18 shows in blocks 166, 168, 176, and 178 the momentary change in current scene, blocks 180 and 182 show the change in current scene that will persistently remain until a timeout has expired. Thus, if the ALL ON+ or ON+ buttons have not been depressed twice within the timeout, the change in current scene will nonetheless revert to the show once that timeout has expired. Accordingly, FIG. 18 illustrates the momentary or the persistent change in current scene for a particular time of day, and possibly subsequent scenes within a show until a timeout has expired, or the show is resumed manually by depressing the ALL ON+ or ON+ buttons twice.

FIG. 18 also illustrates, in addition to momentary or persistent change in current scene, a permanent change to the current scene, as well as possibly other scenes subsequent to that current scene both to multiple zones, or on a zone-by-zone basis. The permanent change begins by depressing the show for a pre-determined amount of time, preferably more than three seconds. Depending on whether the ALL ON+ or the ON+ button was previously depressed and held, and thus whether a scene of multiple zones or a zone within a scene has the brightness and/or color temperature values increased or decreased as shown by blocks 162 and 164, pertaining to a scene, and blocks 172 and 174, applicable to a zone, the corresponding override that is made permanent occurs either at block 186 or block 188.

While the timeout period for the persistent change can be several minutes to several hours, preferably, the pre-determined time in which the show button 103 is depressed is preferably less than 10 seconds but more than three seconds. By depressing the show button 103 less than 10 seconds, whatever the brightness in color temperature value is for the scene or the particular zone within the scene of illumination devices is fixed into the memory of the corresponding illumination devices depending on when the ALL ON+ or ON+ buttons are depressed and held, and the show button is thereafter depressed for a pre-determined time. All the current scenes in that interim timeframe are permanently changed. Alternatively, only the scene nearest the time of day in which the show button 103 is depressed and held is changed. That scene being the current scene within a show. Moreover, that current scene within a show is changed to the new brightness value and/or color temperature value established by the amount of time in which the ALL ON, CCT+/- buttons were depressed.

Figure 19:
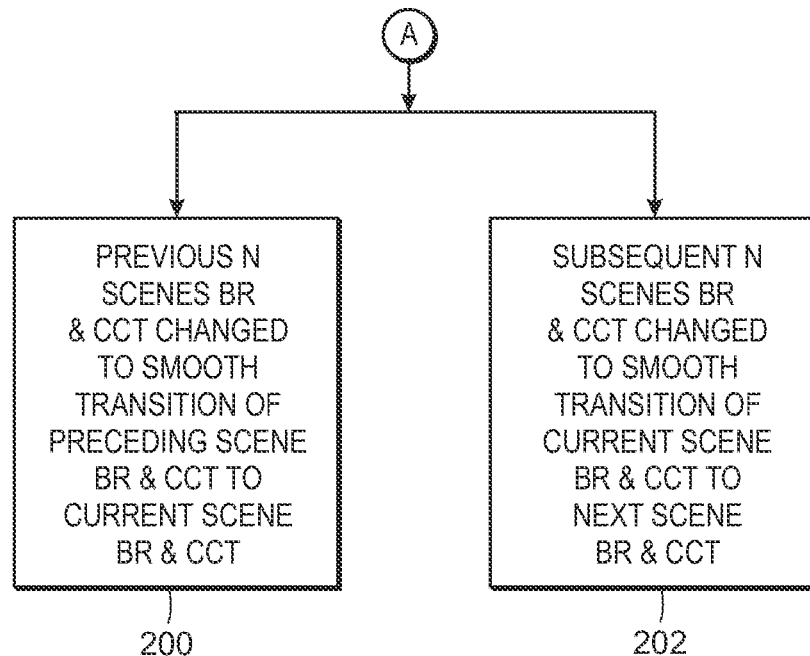
FIG. 19 is a flow diagram of changes to brightness and/or temperature among preceding N number of scenes and subsequent N number of scenes to provide a smoothing of any modification to the brightness and/or color temperature of a current scene of illumination devices.

The current scene change is permanently recorded into the storage medium 56 as the corresponding illumination devices, as shown by blocks 190 and 192. The current scene is therefore permanently changed such that whenever the show is thereafter activated, the scene at that particular time of day that has undergone a permanent change will cause the show forever thereafter at that time of day to display the permanently changed brightness in color temperature values for that time of day. For example, if the show button 103 is depressed a pre-determined amount of time at 11:00 a.m., whatever the brightness and color temperature values that have been changed prior to that time and during that time will be recorded. The next day, at 11:00 a.m., the previous show will now be changed so that at 11:00 a.m., the new scene is displayed. Rather than the old scene, that new scene takes on the brightness and color temperature values established in one or more zones of illumination devices at blocks 160-164 and 170-174. That new scene will now play at that time of day, every day thereafter, until possibly permanently changed again. Other scenes before and after will be adjusted to provide a smooth change in color temperature and brightness over the course of the day. For instance, if at 8:00 p.m., the color temperature is reduced from 2500 to 2200 K, the color temperatures of all scenes in the show from before sunset to the middle of the night will be reduced accordingly. The color temperatures during the morning, noontime, and the middle of the night may remain unchanged. According to one embodiment, FIGS. 19 and 20 further illustrate the smoothing functionality that occurs whenever a permanent change is made to a scene within a show. FIG. 19 is a continuation of blocks 190 and 192 in FIG. 18.

Turning now to FIG. 19, a flow diagram of a change to brightness and/or color temperature among preceding N number of scenes and subsequent N number of scenes is illustrated to provide a smoothing of any modification to the brightness and/or color temperature of a current scene of illumination devices. The change in the current scene can be rather substantial and if the preceding and subsequent scene illumination outputs remain, then a visually perceptible and abrupt display would occur that may be undesirable to a viewer. To provide a smoothing of previous N scenes and subsequent N scenes to the changed current scene, the previous and subsequent scenes must be changed so there is no abrupt visual and disjointed change in color temperature or brightness when the updated and current scene is permanently placed into the natural show. In other words, if a permanent change to brightness occurs at 11:00 a.m., and that current scene brightness is substantially less than the dimcurve for the existing natural show at 11:00 a.m., then possibly N number (preferably fewer than 3) of brightness values for scenes preceding the current scene and N number of brightness value scenes for the same plurality of illumination devices are changed after the 11 a.m. current scene. The previous N number of scenes having their brightness and color temperature changed are shown in block 200, and the subsequently changed N scenes of brightness and color temperature for the same illumination devices are shown in block 202.

Figure 20:
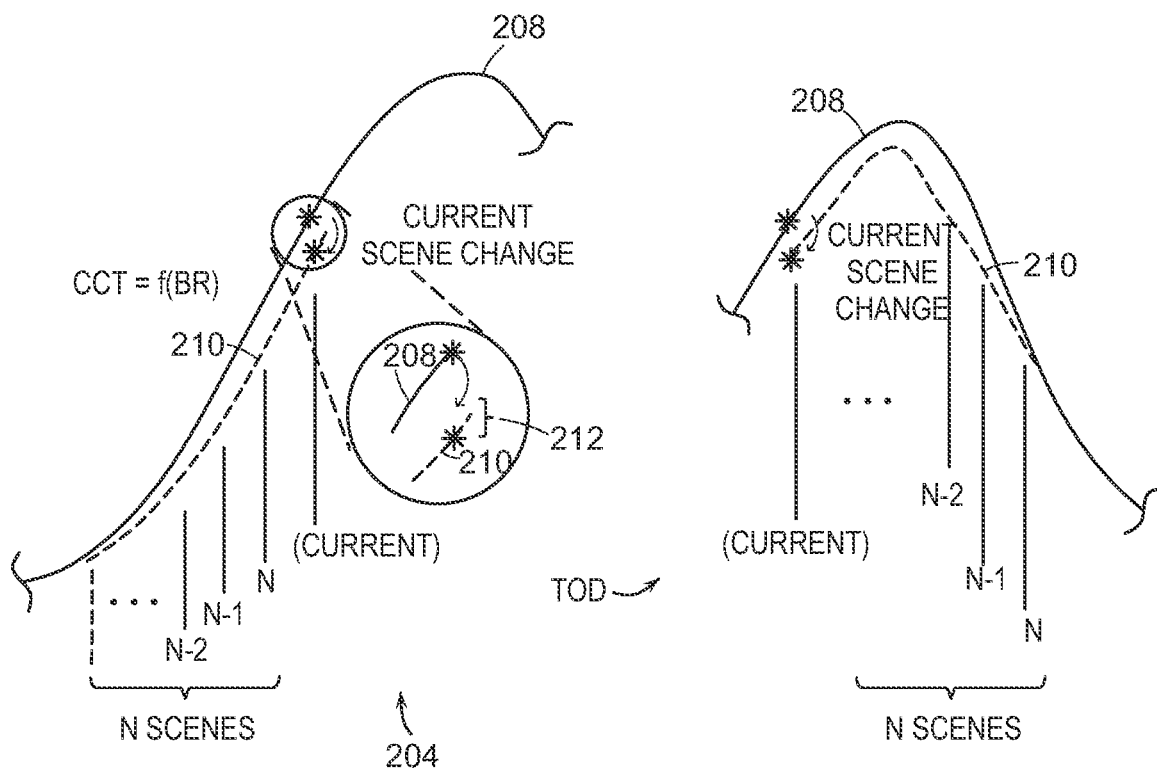
FIG. 20 is a graph of preceding and subsequent N number of changes to brightness and/or color temperature among a scene of illumination devices to provide the smoothing change in brightness and/or color temperature to the permanently changed current scene.

Determining the number N preceding and subsequent to the currently changed scene is pre-determined and is preferably three or less. Therefore, if the changed, current scene is at 11:00 a.m., if there are scenes at 7:00 a.m. and 9:30 a.m. that precede the current scene, those two scenes are also changed so that the resulting dimcurve leading up to the current scene change is not disjointed, as shown in FIG. 20, and specifically the graph 204. Subsequently, the N number of scenes after 11:00 a.m. may comprise two or more scenes as shown. However, only two subsequent scenes are changed at noon and 2:00 p.m., as shown by graph 206. While N can comprise two, the graphs 204 and 206 illustrate possibly more than two scenes depending upon how far apart in time each scene is mapped along a dimcurve. For example, if a scene is mapped every 15 minutes, then N can comprise much more than 3, and can be as much as 20. Regardless of the value of N, it is important to note that not all scenes within a 24-hour period must be changed to provide smoothing. Instead, if the permanently changed scene is at 11:00 a.m., only the scenes after sunrise and leading up to 11:00 a.m., and subsequently after 11:00 a.m. to mid-afternoon need be changed. The scenes after mid-afternoon, and before sunrise need not be changed since sufficient smoothing can occur in a limited number of changed scenes before and after the current changed scene. Thus, the color temperature is a function of brightness before sunrise and after the middle of the afternoon will remain unchanged in the above example.

As noted in FIGS. 6-8, as well as FIG. 13, when creating a plurality of scenes for the same group of illumination devices to form a first dimcurve, that process is repeated using, for example, the GUI and object-oriented programming, to form multiple natural shows and corresponding dimcurves for that same group of illumination devices. Thus, for example, there can be multiple natural shows that are mapped into a table and stored within each of the group of illumination devices. The process is repeated when mapping multiple natural shows and corresponding dimcurves into other groups of illumination devices. Thus, the bedroom can have altogether different dimcurves and natural shows mapped in the illumination devices of the bedroom than that of the kitchen. The dimcurves of color temperature as a function of brightness differs for each dimcurve regardless of the illumination devices that contain the mapped table of dimcurves. Thus, it is necessary that multiple dimcurves, each having a plurality of scenes are mapped into the same group of illumination devices to control the color temperature differently based on changes in brightness. The amount of change can depend on the color temperature at full brightness.

When a scene is permanently changed, as shown by blocks 190 and 192 in FIG. 18, determination of previous and subsequent N scenes and the corresponding color temperature as a function of brightness for those previous and subsequent N scenes is determined depending upon whether the currently changed scene is within a pre-defined distance of a point on another dimcurve. For example, if the permanent change of the current scene is one in which brightness has been decreased, the corresponding color temperature for that current scene will no longer be on, for example, a first dimcurve 208. Instead, the current scene change caused by a reduction in brightness will result in a color temperature (CCT) that is less than the color temperature along dimcurve 208. If, for example, the changed-to, or new color temperature for the updated, and changed current scene is within a pre-defined distance of a point on a second dimcurve 210, shown in dashed line, then the scenes preceding the current scene and subsequent to the current scene are recalled or fetched from the second dimcurve 210 stored in the storage medium 56 of the group of illumination devices being controlled.

Only a portion of the second dimcurve 210 is fetched from each of the group of illumination devices being controlled, and that second portion comprises N number of scenes preceding the changed scene in N number of scenes succeeding the changed scene to provide a smooth and non-disjointed second natural show having scenes on a second dimcurve immediately preceding and succeeding the current scene, yet maintaining all of the scenes along the first dimcurve 208 before the preceding N scenes and after the succeeding N scenes.

According to one embodiment, the pre-defined distance of the point on the second dimcurve, shown as 212, is preferably less than 5% of the color temperature of the scene on the second dimcurve at the particular time of day for that current scene. For example, if the time of day is 11:00 a.m., and the current scene change changes from the first dimcurve 208 having a higher color temperature as a function of brightness to dimcurve 210 having lower color temperature as a function of brightness, the new current scene may not have a color temperature precisely on the second dimcurve. Instead, the current scene color temperature as a function of brightness can be within a pre-defined distance 212 of the second dimcurve 210. If that pre-defined distance is less than 5% of the color temperature of the scene on the second dimcurve at 11:00 a.m., then the current scene is placed on the second dimcurve nonetheless, as well as all preceding N scenes and succeeding N scenes. For example, if the color temperature along the second dimcurve at 11:00 a.m. for the current scene of the first dimcurve is 4000 K, whereas the second dimcurve at 11:00 a.m. the color temperature is 3800 K, if the current scene change decreases brightness and/or color temperature to that of a color temperature within 5% of the color temperature for that scene at 11:00 a.m., or 5% of 3800 K=190 K, then the current scene will be placed on the second dimcurve as well as the preceding and succeeding N scenes. Accordingly, the pre-defined distance is less than 5%, or an absolute value is less than 190 K, and more preferably less than 2%, or approximately 70 K. As shown in FIG. 20, the value for the pre-defined distance 212 is therefore 5% of the color temperature along the second dimcurve at the particular time of day for that current scene being permanently changed. Since the first and second dimcurves are already mapped into tables placed in corresponding illumination devices any permanent change to a particular scene simply causes a selective fetching of the current and previous as well as subsequent scenes along a second dimcurve if a change is made so that it is sufficient enough to be near the second dimcurve a pre-defined color temperature distance. The pre-defined distance can also be measured in terms of brightness. If the current scene change involves a change in brightness that is relatively close to a second dimcurve brightness, then the current scene will be placed on a second dimcurve along with the preceding and succeeding N scenes. That pre-defined brightness can also be 5% or less.

Even though different groups of illumination devices within a structure have different dimcurves and different natural shows, a global override of all or multiple groups of illumination devices can occur through use of a singular, global keypad, such as keypad 57 shown in FIG. 10. Preferably, global keypad 57 comprises a singular keypad that controls the entire structure, and specifically multiple groups of illumination devices arranged throughout that structure. Also, preferably, the global keypad is arranged possibly near the entry door, or possibly near the master bedroom.

The global keypad comprises at least one of the plurality of buttons, and that button preferably comprises an away button. The away button is used to activate a sensor to detect movement within the structure and, in response to that movement, to turn on and off an automatic periodic succession the select ones of multiple groups of illumination devices throughout the structure. The turning on and turning off an automatic, periodic succession is referred to herein as a panic show. The panic show will therefore override the various natural shows that can occur in different groups of illumination devices whenever, for example, a sensor detects an intruder within the structure, or within a perimeter of the structure.

The button on the global keypad 57 therefore can activate an away mode for detecting movement or, alternatively, when not activated, the button can enable a natural show. Therefore, depending on the state of that button on the global keypad, a natural show of automatically and periodically changing color temperature as a function of brightness at different times of day along a selected dimcurve occurs prior to enabling the panic show when an intruder is detected. Thus, in the away mode, the natural show can continue and, when an intruder is detected, the natural show automatically changes to the panic show. Activation of the away mode to enable the natural show prior to sensing an intruder can occur through a single depression on a button and a light on the global keypad will indicate the away mode is enabled. Alternatively, the button can enable a static scene from select ones of the multiple groups of illumination devices prior to enabling the panic show when an intruder is detected. Thus, prior to detecting an intruder, the button can be illuminated to indicate an away mode, and to maintain the brightness in color temperature the same for the select ones of the multiple groups of illumination devices prior to sensing the intruder and, once an intruder is detected, the panic show is enabled. According to an alternative embodiment, the panic show can comprise turning on and off an automatic, time succession select ones of multiple groups of illumination devices throughout, as well as outside, the structure, or simply initiating a change in color of the select ones of the multiple groups of illumination devices.

It will be appreciated by those skilled in the art having the benefit of this disclosure that this invention is believed to provide an improved illumination system and method that not only allows mapping of dimcurves for each of multiple groups of illumination devices into the corresponding illumination devices, but also using those mapped dimcurves to allow modification of any and all natural shows throughout a structure when an intruder is detected. A remote controller with a graphical user interface provides the ease by which mapping of dimcurve tables takes place, and multiple keypads assigned to groups of illumination devices allows easy momentary and persistent changes, as well as permanent changes, to the various scenes which form a natural show along the dimcurve. Further modifications and alternative embodiments of various aspects of the invention will be apparent to those skilled in the art in view of this description. It is intended, therefore, that the following claims be interpreted to embrace all such modifications and changes.

The invention claimed is:

1. A light-emitting diode (LED) light fixture controller, comprising:
    memory circuitry to store a plurality of scenes, each of the scenes arranged chronologically to provide a show that follows a dimcurve, each of the plurality of scenes including data representative of:
        an illumination intensity and a color temperature produced by the LED light fixture during the respective scene, the color temperature related to the intensity according to the dimcurve; and
        a defined start time of the respective scene;
    communications interface circuitry to receive from a user interface device a clock signal and at least one user command;
    LED light fixture control circuitry coupled to the memory circuitry and to the communications interface circuitry, the control circuitry to:
        adjust the color temperature and the illumination intensity of the LED light fixture to correspond to a current one of the plurality of scenes based on the dimcurve and the received clock signal; and
        receive, from the user interface device, a first command that includes data representative of a temporary transition of the illumination intensity provided by the LED light fixture from the illumination intensity corresponding to the current scene to a target illumination intensity;
    responsive to receipt of the first command:
        determine a target color temperature as a function of the received target illumination intensity using a second dimcurve in which, for a given change in illumination intensity of the LED light fixture, a change in the color temperature at clock times near sunrise and sunset is greater than a change in the color temperature at a clock time near solar noon;
        transition, for a duration of the current one of the plurality of scenes, the color temperature and the illumination intensity of the LED light fixture to the received target illumination intensity and the determined target color temperature;

determine one or more adjustments to transition from the target illumination intensity and the target color temperature to the illumination intensity and color temperature of a chronologically subsequent scene; and cause the chronological presentation of the stored plurality of scenes in accordance with the dimcurve stored in the memory circuitry.

2. The LED light fixture of claim 1 wherein the LED light fixture control circuitry to further:

receive, from the user interface device, a second command that includes data representative of a permanent change in the illumination intensity provided by the LED light fixture from the illumination intensity corresponding to the current scene to a target illumination intensity;

responsive to receipt of the second command:
determine a target color temperature as a function of the received target illumination intensity;
create a correspondence between the current scene, the received target illumination intensity and the determined target color temperature of the LED light fixture;
cause a storage, in the memory circuitry, of data representative of the correspondence between the current scene, the received target illumination intensity, and the determined target color temperature of the LED light fixture;
transition the color temperature and the illumination intensity of the LED light fixture to the received target illumination intensity and the determined target color temperature for a duration of the current scene;
determine one or more adjustments to transition from the target illumination intensity and the target color temperature of the current scene to the new target illumination intensity and the new target color temperature that correspond to the subsequent sequentially arranged scene in the show; and
resume the sequential presentation of the stored plurality of sequentially arranged scenes in accordance with the first dimcurve stored in the memory circuitry.

3. The LED light fixture of claim 1, wherein to adjust the color temperature and the illumination intensity of the LED light fixture output to correspond to the current one of the plurality of the sequentially arranged scenes based on the first dimcurve, the LED light fixture control circuitry to further:

adjust the color temperature and the illumination intensity of the LED light fixture to correspond to a current one of the plurality of sequentially arranged scenes based on a first natural show dimcurve.

4. The LED light fixture of claim 3, wherein to determine the target color temperature as a function of the received target illumination intensity, the LED light fixture control circuitry to further:

identify a second dimcurve that includes the received target illumination intensity; and
determine the target color temperature as a function of the received target illumination intensity using the identified second dimcurve.

5. A light-emitting diode lamp control method, comprising:

adjusting, by LED light fixture control circuitry, a color temperature and an illumination intensity of an LED light fixture to correspond to a current one of a plurality of scenes based on a dimcurve stored in memory circuitry of the LED light fixture and a clock signal received from a user interface device;

the plurality of scenes arranged chronologically to provide a show that follows a dimcurve, each of the scenes including data representative of:
the illumination intensity and the color temperature produced by the LED light fixture during the respective scene, the color temperature related to the intensity according to the dimcurve; and
a defined start time of the respective scene; and receiving, by the LED light fixture control circuitry from a user interface device, a first command that includes data representative of a temporary transition of the illumination intensity produced by the LED lighting fixture from the illumination intensity corresponding to the current scene to a target illumination intensity;

responsive to receipt of the first command:
determining, by the LED light fixture control circuitry, a target color temperature as a function of the received target illumination intensity using a second dimcurve in which, for a given change in illumination intensity of the LED light fixture, a change in the color temperature at clock times near sunrise and sunset is greater than a change in the color temperature at a clock time near solar noon;
transitioning, by the LED light fixture control circuitry for a duration of the current scene, the color temperature and the intensity of the LED lighting fixture to the received target illumination intensity and the determined target color temperature;
determining, by the LED light fixture control circuitry, one or more adjustments to transition from the target illumination intensity and the target color temperature to the illumination intensity and color temperature of a chronologically subsequent scene; and
causing, by the LED light fixture control circuitry, the chronological presentation of the stored plurality of scenes in accordance with the dimcurve stored in the memory circuitry.

6. The method of claim 5, further comprising:

receiving, by the LED light fixture control circuitry, a second command that includes data representative of a permanent change in the illumination intensity provided by the LED lighting fixture in the current scene to a target illumination intensity for the current scene;

responsive to receipt of the second command:
determining, by the LED light fixture control circuitry, a target color temperature as a function of the received target illumination intensity;
creating, by the LED light fixture control circuitry, a correspondence between the current scene, the received target illumination intensity and the determined target color temperature of the LED light fixture;
causing, by the LED light fixture control circuitry, a storage in the memory circuitry of data representative of the correspondence between the current scene, the received target illumination intensity, and the determined target color temperature of the LED light fixture;
causing by the LED light fixture control circuitry, a transition of the color temperature and the illumination intensity of the LED light fixture to the received target illumination intensity and the determined target color temperature for a duration of the current scene;

determining, by the LED light fixture control circuitry, one or more adjustments to transition, from the target illumination intensity and the target color temperature of the current scene to the new target illumination intensity and the new color temperature that correspond to the subsequent sequentially arranged scene in the show; and resuming, by the LED light fixture control circuitry, the sequential presentation of the stored plurality of sequentially arranged scenes in accordance with the first dimcurve stored in the memory circuitry.

7. The method of claim 5 wherein adjusting the color temperature and the illumination intensity of an LED light fixture to correspond to a current one of the plurality of the sequentially arranged scenes based on the first dimcurve stored in the memory circuitry of the LED light fixture further comprises:

adjusting, by the LED light fixture control circuitry, the color temperature and the illumination intensity of the LED lighting fixture to correspond to a current one of the plurality of sequentially arranged scenes based on a first natural show dimcurve and the received clock signal.

8. The method of claim 7, wherein determining the target color temperature corresponding to the received target illumination intensity further comprises:

identifying, by the LED light fixture control circuitry, a second dimcurve that includes the received target illumination intensity; and determining, by the LED light fixture control circuitry, the target color temperature as a function of the received target illumination intensity using the identified second dimcurve.

9. A non-transitory, machine-readable, storage device that includes instructions that, when executed by LED light fixture control circuitry, cause the LED light control circuitry to:

adjust a color temperature and an illumination intensity of an LED light fixture to correspond to a current one of a plurality of scenes based on a dimcurve stored in memory circuitry of the LED light fixture and a clock signal received from a user interface device;
  the plurality of scenes arranged chronologically to provide a show that follows a dimcurve, each of the scenes including data representative of:
    the illumination intensity and the color temperature produced by the LED light fixture during the respective scene, the color temperature related to the intensity according to the dimcurve; and
    a defined start time of the respective scene; and receive a first command from a user interface, the first command including data representative of a temporary transition of the illumination intensity produced by the LED light fixture from the illumination intensity corresponding to the current scene to a target illumination intensity;

responsive to receipt of the first command:
  determine a target color temperature corresponding to the received target illumination intensity using a second dimcurve in which, for a given change in illumination intensity of the LED light fixture, a change in the color temperature at clock times near sunrise and sunset is greater than a change in the color temperature at a clock time near solar noon;
  transition the color temperature and the illumination intensity of the LED lighting fixture to the received target illumination intensity and the determined target color temperature for a duration of the current scene;
  determine one or more adjustments to transition from the target illumination intensity and the target color temperature to the illumination intensity and color temperature of a chronologically subsequent scene; and
  cause the chronological presentation of the stored plurality of scenes in accordance with the dimcurve stored in the memory circuitry.

10. The non-transitory, machine-readable, storage device of claim 9 wherein the instructions, when executed by the LED light fixture control circuitry further cause the LED light fixture control circuitry to:

receive a second command that includes data representative of a permanent change of the illumination intensity provided by the LED lighting fixture in the current scene to a target illumination intensity for the current scene;

responsive to receipt of the second command:
  determine a target color temperature corresponding to the received target illumination intensity;
  create a correspondence between the current scene, the received target illumination intensity and the determined target color temperature of the LED light fixture;
  cause a storage, in the memory circuitry, of data representative of the correspondence between the current scene, the received target illumination intensity, and the determined target color temperature of the LED light fixture;
  transition the color temperature and the illumination intensity of the LED light fixture to the received target illumination intensity and the determined target color temperature for a duration of the current scene;
  determine one or more adjustments to transition, at the conclusion of the current scene, from the target illumination intensity and the target color temperature to the illumination intensity and color temperature of a subsequent scene; and
  cause the chronological presentation of the stored plurality of scenes in accordance with the dimcurve stored in the memory circuitry.

11. The non-transitory, machine-readable, storage device of claim 10 wherein the instructions that cause the LED light fixture control circuitry to adjust the color temperature and the illumination intensity of an LED light fixture to correspond to the current one of the plurality of sequentially arranged scenes based on the first dimcurve stored in the memory circuitry of the LED light fixture further cause the LED light fixture control circuitry to:

adjust the color temperature and the illumination intensity of the LED light fixture to correspond to the current scene in the plurality of sequentially arranged scenes using the first dimcurve, wherein the first dimcurve is associated with a first natural show.

12. The non-transitory, machine-readable, storage device of claim 11 wherein the instructions that cause the LED light fixture control circuitry to determine the target color temperature corresponding to the received target illumination intensity further cause the LED light fixture control circuitry to:

identify a second dimcurve that includes the received target illumination intensity; and determine the target color temperature as a function of the received target illumination intensity using the identified second dimcurve.

\* \* \* \* \*